(12) United States Patent
Bergström et al.

(10) Patent No.: US 11,650,699 B2
(45) Date of Patent: *May 16, 2023

(54) OPTICAL COMPONENT

(71) Applicant: FlatFrog Laboratories AB, Lund (SE)

(72) Inventors: Håkan Bergström, Torna-Hallestad (SE); Thomas Craven-Bartle, Södra Sandby (SE); Lars Rippe, Lund (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,505

(22) Filed: Feb. 2, 2022

(65) Prior Publication Data
US 2022/0291774 A1    Sep. 15, 2022

Related U.S. Application Data

(63) Continuation of application No. 16/642,847, filed as application No. PCT/SE2018/050871 on Aug. 30, 2018, now Pat. No. 11,256,371.

(30) Foreign Application Priority Data

Sep. 1, 2017 (SE) .................................. 1730234-0

(51) Int. Cl.
G06F 3/042 (2006.01)
G06F 3/041 (2006.01)
(52) U.S. Cl.
CPC .......... G06F 3/0421 (2013.01); G06F 3/0416 (2013.01)
(58) Field of Classification Search
CPC ............................. G06F 3/0421; G06F 3/0416
See application file for complete search history.

(56) References Cited

U.S. PATENT DOCUMENTS 3,440,426 A   4/1969 Bush
3,553,680 A   1/1971 Cooreman
(Continued)

FOREIGN PATENT DOCUMENTS

AU   2008 280 952 A1   3/2009
AU   2014201966         4/2014
(Continued)

OTHER PUBLICATIONS

Ahn, Y., et al., "A slim and wide multi-touch tabletop interface and its applications," BigComp2014, IEEE, 2014, in 6 pages.
(Continued)

*Primary Examiner* — Ibrahim A Khan
(74) *Attorney, Agent, or Firm* — Knobbe Martens Olson & Bear LLP

(57) ABSTRACT

A touch sensing apparatus is provided comprising: a light transmissive panel that defines a touch surface, a plurality of light emitters and detectors arranged along a perimeter of the light transmissive panel, a plurality of optical components arranged along the perimeter of the light transmissive panel, wherein the light emitters are arranged to emit a respective beam of emitted light and the optical components are configured to direct the emitted light to a path across the light transmissive panel. Optionally, optical components comprise a light guide arranged to receive light from the light emitters through a first surface and couple out light travelling in the light guide to the touch surface through a second surface. The second surface may be diffusively transmissive. The light guide may further comprise a reflective surface configured to internally reflect light travelling in the light guide from the first surface to the diffusive surface. The reflective surface may be diffusely reflective, partially diffusely reflective, or specularly reflective.

18 Claims, 21 Drawing Sheets

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,550 A | 9/1989 | Hiroaki et al. |
| 4,868,912 A | 9/1989 | Doering |
| 4,891,829 A | 1/1990 | Deckman et al. |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,608,550 A | 3/1997 | Epstein et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,729,250 A | 3/1998 | Bishop et al. |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,133,031 B2 | 11/2006 | Wang et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,729,056 B2 | 6/2010 | Hwang et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,319,729 B2 | 11/2012 | Choi et al. |
| 8,325,158 B2 | 12/2012 | Yatsuda et al. |
| 8,339,379 B2 | 12/2012 | Goertz et al. |

(56) References Cited

U.S. PATENT DOCUMENTS

| | | |
|---|---|---|
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fahraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,001,086 B1* | 4/2015 | Saini .................... G06F 3/0428 345/175 |
| 9,024,896 B2 | 5/2015 | Chen |
| 9,024,916 B2 | 5/2015 | Christiansson |
| 9,035,909 B2 | 5/2015 | Christiansson |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,201,520 B2 | 12/2015 | Benko et al. |
| 9,207,800 B1 | 12/2015 | Eriksson et al. |
| 9,213,445 B2 | 12/2015 | King et al. |
| 9,274,645 B2 | 3/2016 | Christiansson et al. |
| 9,280,237 B2 | 3/2016 | Kukulj |
| 9,291,845 B2 | 3/2016 | Shin et al. |
| 9,317,146 B1 | 4/2016 | Hufnagel |
| 9,317,168 B2 | 4/2016 | Christiansson et al. |
| 9,323,396 B2 | 4/2016 | Han et al. |
| 9,366,565 B2 | 6/2016 | Uvnäs |
| 9,366,802 B2 | 6/2016 | Lee et al. |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåahraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,652,082 B1* | 5/2017 | Lin .................... G06F 1/1626 |
| 9,678,602 B2 | 6/2017 | Wallander |
| 9,684,414 B2 | 6/2017 | Christiansson et al. |
| 9,710,101 B2 | 7/2017 | Christiansson et al. |
| 9,874,978 B2 | 1/2018 | Wall |
| 9,983,626 B2 | 5/2018 | Cao et al. |
| 10,013,107 B2 | 7/2018 | Christiansson et al. |
| 10,019,113 B2 | 7/2018 | Christiansson et al. |
| 10,282,035 B2 | 5/2019 | Kocovksi et al. |
| 10,397,638 B2* | 8/2019 | Kanematsu .......... G06F 3/0412 |
| 10,417,219 B1* | 9/2019 | Yang .................... H04L 9/0643 |
| 10,649,585 B1 | 5/2020 | van Beek et al. |
| 10,691,638 B1* | 6/2020 | Lyadvinsky .......... G06F 3/0622 |
| 10,853,315 B1* | 12/2020 | Faibish ................. G06F 16/137 |
| 10,884,275 B2 | 1/2021 | Yang et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1* | 8/2005 | Nishikawa .......... H01L 27/3244 313/500 |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0098004 A1* | 5/2006 | Cok .................... G06F 3/0412 345/207 |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |

(56) References Cited

U.S. PATENT DOCUMENTS

| | | |
|---|---|---|
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1* | 4/2007 | Leung ............... G06F 16/122 |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0074402 A1* | 3/2008 | Cornish ............... G06F 3/0421 |
| | | 345/176 |
| 2008/0080811 A1 | 4/2008 | Deane |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0000831 A1 | 1/2009 | Miller et al. |
| 2009/0002340 A1 | 1/2009 | Van Genechten |
| 2009/0006292 A1 | 1/2009 | Block |
| 2009/0040786 A1 | 2/2009 | Mori |
| 2009/0058832 A1* | 3/2009 | Newton ............... G06F 3/0421 |
| | | 345/175 |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0065424 A1* | 3/2011 | Estevez ............... H04W 48/18 |
| | | 455/414.3 |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1* | 7/2011 | Goertz ............... G06F 3/042 |
| | | 345/175 |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0205189 A1 | 8/2011 | Newton |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |

(56) References Cited

U.S. PATENT DOCUMENTS

| | | |
|---|---|---|
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0056081 A1* | 3/2012 | Kozodoy ............ G02B 6/0023 385/36 |
| 2012/0056807 A1 | 3/2012 | Chapman et al. |
| 2012/0062474 A1 | 3/2012 | Weishaupt et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0098733 A1* | 4/2012 | Masuda ............... G06F 3/1454 345/2.2 |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0170056 A1 | 7/2012 | Jakobsen et al. |
| 2012/0176343 A1* | 7/2012 | Holmgren ............ G06F 3/0421 345/175 |
| 2012/0181419 A1 | 7/2012 | Momtahan |
| 2012/0182266 A1 | 7/2012 | Han |
| 2012/0188206 A1* | 7/2012 | Sparf ..................... G06F 3/042 362/326 |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218229 A1 | 8/2012 | Drumm |
| 2012/0221715 A1* | 8/2012 | Hamada ............... H04L 67/535 709/224 |
| 2012/0223916 A1 | 9/2012 | Kukulj |
| 2012/0242622 A1 | 9/2012 | Tseng et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2012/0313865 A1 | 12/2012 | Pearce |
| 2013/0007579 A1* | 1/2013 | Dancy .................... G06Q 50/01 715/205 |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0141395 A1* | 6/2013 | Holmgren ............ G06F 1/1643 345/175 |
| 2013/0154983 A1 | 6/2013 | Christiansson et al. |
| 2013/0155027 A1* | 6/2013 | Holmgren ............... G06F 1/169 345/175 |
| 2013/0155655 A1 | 6/2013 | Lee et al. |
| 2013/0158504 A1 | 6/2013 | Ruchti et al. |
| 2013/0181896 A1 | 7/2013 | Gruhlke et al. |
| 2013/0181953 A1 | 7/2013 | Hinckley et al. |
| 2013/0187891 A1 | 7/2013 | Eriksson et al. |
| 2013/0201142 A1 | 8/2013 | Suarez Rovere |
| 2013/0222344 A1 | 8/2013 | Lu et al. |
| 2013/0222346 A1 | 8/2013 | Chen et al. |
| 2013/0234991 A1 | 9/2013 | Sparf |
| 2013/0241886 A1* | 9/2013 | Eriksson ............... G02B 6/0075 362/606 |
| 2013/0241887 A1 | 9/2013 | Sharma |
| 2013/0249833 A1 | 9/2013 | Christiansson et al. |
| 2013/0250354 A1* | 9/2013 | Kato .................. H04N 1/00225 358/1.15 |
| 2013/0254314 A1* | 9/2013 | Chow ..................... H04L 51/08 709/206 |
| 2013/0257810 A1 | 10/2013 | Niu et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300714 A1 | 11/2013 | Goh et al. |
| 2013/0300716 A1 | 11/2013 | Craven-Bartle et al. |
| 2013/0307795 A1 | 11/2013 | Suarez Rovere |
| 2013/0321740 A1 | 12/2013 | An et al. |
| 2013/0342490 A1 | 12/2013 | Wallander et al. |
| 2014/0002400 A1 | 1/2014 | Christiansson et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1* | 1/2014 | Kapoor ................. G06F 9/5083 709/224 |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0139467 A1 | 5/2014 | Ghosh et al. |
| 2014/0152624 A1 | 6/2014 | Piot et al. |
| 2014/0160762 A1 | 6/2014 | Dudik et al. |
| 2014/0192023 A1 | 7/2014 | Hoffman |
| 2014/0210793 A1 | 7/2014 | Eriksson et al. |
| 2014/0226084 A1 | 8/2014 | Utukuri et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0362404 A1* | 12/2014 | Miyasaka .............. G06F 3/1273 358/1.15 |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0009687 A1 | 1/2015 | Lin |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |

(56) References Cited

U.S. PATENT DOCUMENTS

| | | | |
|---|---|---|---|
| 2015/0070327 A1* | 3/2015 | Hsieh | G06F 3/0421 345/175 |
| 2015/0083891 A1 | 3/2015 | Wallander | |
| 2015/0092233 A1* | 4/2015 | Park | H04N 1/00244 358/1.15 |
| 2015/0103013 A9 | 4/2015 | Huang | |
| 2015/0109403 A1* | 4/2015 | Krishnan | H04N 7/152 348/14.08 |
| 2015/0121691 A1 | 5/2015 | Wang | |
| 2015/0130769 A1 | 5/2015 | Björklund | |
| 2015/0131010 A1 | 5/2015 | Sugiyama | |
| 2015/0138105 A1 | 5/2015 | Christiansson et al. | |
| 2015/0138158 A1 | 5/2015 | Wallander et al. | |
| 2015/0138161 A1 | 5/2015 | Wassvik | |
| 2015/0199071 A1 | 7/2015 | Hou | |
| 2015/0205441 A1 | 7/2015 | Bergström et al. | |
| 2015/0215450 A1 | 7/2015 | Seo et al. | |
| 2015/0242055 A1 | 8/2015 | Wallander | |
| 2015/0256658 A1 | 9/2015 | Shin et al. | |
| 2015/0261323 A1 | 9/2015 | Cui et al. | |
| 2015/0271481 A1 | 9/2015 | Guthrie et al. | |
| 2015/0286698 A1 | 10/2015 | Gagnier et al. | |
| 2015/0288327 A1* | 10/2015 | Cherukupalli | H02S 40/32 136/251 |
| 2015/0302026 A1* | 10/2015 | Nam | G06F 16/183 707/827 |
| 2015/0309765 A1* | 10/2015 | Nagahara | H04M 3/567 345/2.2 |
| 2015/0317036 A1 | 11/2015 | Johansson et al. | |
| 2015/0324028 A1 | 11/2015 | Wassvik et al. | |
| 2015/0331544 A1 | 11/2015 | Bergström et al. | |
| 2015/0331545 A1 | 11/2015 | Wassvik et al. | |
| 2015/0331546 A1 | 11/2015 | Craven-Bartle et al. | |
| 2015/0331547 A1 | 11/2015 | Wassvik et al. | |
| 2015/0332655 A1 | 11/2015 | Krus et al. | |
| 2015/0339000 A1 | 11/2015 | Lee et al. | |
| 2015/0346856 A1 | 12/2015 | Wassvik | |
| 2015/0346911 A1 | 12/2015 | Christiansson | |
| 2015/0363042 A1 | 12/2015 | Krus et al. | |
| 2015/0373864 A1 | 12/2015 | Jung | |
| 2016/0004898 A1 | 1/2016 | Holz | |
| 2016/0026297 A1 | 1/2016 | Shinkai et al. | |
| 2016/0026337 A1 | 1/2016 | Wassvik et al. | |
| 2016/0034099 A1 | 2/2016 | Christiansson et al. | |
| 2016/0041629 A1 | 2/2016 | Rao et al. | |
| 2016/0050263 A1* | 2/2016 | Hwang | H04L 51/04 709/204 |
| 2016/0050746 A1 | 2/2016 | Wassvik et al. | |
| 2016/0062549 A1 | 3/2016 | Drumm et al. | |
| 2016/0065633 A1* | 3/2016 | Kawakubo | H04N 21/4788 715/753 |
| 2016/0070415 A1 | 3/2016 | Christiansson et al. | |
| 2016/0070416 A1 | 3/2016 | Wassvik | |
| 2016/0092021 A1 | 3/2016 | Tu et al. | |
| 2016/0103026 A1 | 4/2016 | Povazay et al. | |
| 2016/0117019 A1 | 4/2016 | Michiaki | |
| 2016/0124546 A1 | 5/2016 | Chen et al. | |
| 2016/0124551 A1 | 5/2016 | Christiansson et al. | |
| 2016/0077616 A1 | 6/2016 | Durojaiye et al. | |
| 2016/0154531 A1 | 6/2016 | Wall | |
| 2016/0154532 A1 | 6/2016 | Campbell | |
| 2016/0154533 A1 | 6/2016 | Eriksson et al. | |
| 2016/0179261 A1 | 6/2016 | Drumm | |
| 2016/0202841 A1 | 7/2016 | Christiansson et al. | |
| 2016/0209886 A1 | 7/2016 | Suh et al. | |
| 2016/0210306 A1* | 7/2016 | Kumarasamy | G06F 16/178 |
| 2016/0216844 A1 | 7/2016 | Bergström | |
| 2016/0224144 A1 | 8/2016 | Klinghult et al. | |
| 2016/0227381 A1* | 8/2016 | Bargetzi | H04N 7/147 |
| 2016/0255713 A1 | 9/2016 | Kim et al. | |
| 2016/0269329 A1* | 9/2016 | Willis | H04L 51/08 |
| 2016/0295711 A1 | 10/2016 | Ryu et al. | |
| 2016/0299583 A1 | 10/2016 | Watanabe | |
| 2016/0299593 A1 | 10/2016 | Christiansson et al. | |
| 2016/0306501 A1 | 10/2016 | Drumm et al. | |
| 2016/0328090 A1 | 11/2016 | Klinghult | |
| 2016/0328091 A1 | 11/2016 | Wassvik et al. | |
| 2016/0334942 A1 | 11/2016 | Wassvik | |
| 2016/0342282 A1 | 11/2016 | Wassvik | |
| 2016/0357348 A1 | 12/2016 | Wallander | |
| 2017/0010688 A1 | 1/2017 | Fahraeus et al. | |
| 2017/0031516 A1 | 2/2017 | Sugiyama et al. | |
| 2017/0075484 A1 | 3/2017 | Kali et al. | |
| 2017/0090090 A1 | 3/2017 | Craven-Bartle et al. | |
| 2017/0094224 A1* | 3/2017 | Hasegawa | H04L 65/1069 |
| 2017/0102827 A1 | 4/2017 | Christiansson et al. | |
| 2017/0115235 A1 | 4/2017 | Ohlsson et al. | |
| 2017/0115823 A1 | 4/2017 | Huang et al. | |
| 2017/0123257 A1 | 5/2017 | Zhao | |
| 2017/0139541 A1 | 5/2017 | Christiansson et al. | |
| 2017/0160871 A1 | 6/2017 | Drumm | |
| 2017/0177163 A1 | 6/2017 | Wallander et al. | |
| 2017/0185230 A1 | 6/2017 | Wallander et al. | |
| 2017/0220204 A1 | 8/2017 | Huang et al. | |
| 2017/0237871 A1* | 8/2017 | Fan | H04N 1/00482 358/1.13 |
| 2017/0293392 A1 | 10/2017 | Christiansson et al. | |
| 2017/0318115 A1* | 11/2017 | Peng | H04W 4/00 |
| 2017/0344185 A1 | 11/2017 | Ohlsson et al. | |
| 2018/0031753 A1 | 2/2018 | Craven-Bartle et al. | |
| 2018/0107373 A1 | 4/2018 | Cheng | |
| 2018/0129354 A1 | 5/2018 | Christiansson et al. | |
| 2018/0136788 A1 | 5/2018 | He et al. | |
| 2018/0149792 A1 | 5/2018 | Lee et al. | |
| 2018/0210572 A1 | 7/2018 | Wallander et al. | |
| 2018/0225006 A1 | 8/2018 | Wall | |
| 2018/0253187 A1 | 9/2018 | Christiansson et al. | |
| 2018/0267672 A1 | 9/2018 | Wassvik et al. | |
| 2018/0275788 A1 | 9/2018 | Christiansson et al. | |
| 2018/0275830 A1 | 9/2018 | Christiansson et al. | |
| 2018/0275831 A1 | 9/2018 | Christiansson et al. | |
| 2018/0314206 A1 | 11/2018 | Lee et al. | |
| 2019/0004668 A1 | 1/2019 | Jeong et al. | |
| 2019/0025984 A1 | 1/2019 | Weilbacher et al. | |
| 2019/0050074 A1 | 2/2019 | Kocovski | |
| 2019/0107923 A1 | 4/2019 | Drumm | |
| 2019/0146630 A1 | 5/2019 | Chen et al. | |
| 2019/0196658 A1 | 6/2019 | Skagmo et al. | |
| 2019/0196659 A1 | 6/2019 | Skagmo et al. | |
| 2019/0227670 A1 | 7/2019 | O'Cleirigh et al. | |
| 2019/0235701 A1 | 8/2019 | Han et al. | |
| 2019/0258353 A1 | 8/2019 | Drumm et al. | |
| 2019/0265941 A1* | 8/2019 | Baba | G06F 16/955 |
| 2019/0196657 A1 | 10/2019 | Skagmo et al. | |
| 2019/0324570 A1 | 10/2019 | Kolundzjia et al. | |
| 2019/0377431 A1 | 12/2019 | Drumm | |
| 2019/0377435 A1 | 12/2019 | Piot et al. | |
| 2020/0012408 A1 | 1/2020 | Drumm et al. | |
| 2020/0073509 A1 | 3/2020 | Shih et al. | |
| 2020/0098147 A1 | 3/2020 | Ha et al. | |
| 2020/0125189 A1 | 4/2020 | Kim et al. | |
| 2020/0159382 A1 | 5/2020 | Drumm | |
| 2020/0167033 A1 | 5/2020 | Kim et al. | |
| 2020/0249777 A1 | 8/2020 | Hou et al. | |
| 2020/0310621 A1 | 10/2020 | Piot et al. | |
| 2020/0341587 A1 | 10/2020 | Drumm | |
| 2020/0348473 A1 | 11/2020 | Drumm | |
| 2020/0387237 A1 | 12/2020 | Drumm | |

FOREIGN PATENT DOCUMENTS

| | | |
|---|---|---|
| CN | 201233592 Y | 5/2009 |
| CN | 101174191 A | 6/2009 |
| CN | 101644854 A | 2/2010 |
| CN | 201437963 U | 4/2010 |
| CN | 201465071 U | 5/2010 |
| CN | 101882034 | 11/2010 |
| CN | 102117155 A | 7/2011 |
| CN | 101019071 B | 6/2012 |
| CN | 101206550 B | 6/2012 |
| CN | 202887145 U | 4/2013 |
| CN | 103123556 A | 5/2013 |
| CN | 203189466 U | 9/2013 |

(56) References Cited

FOREIGN PATENT DOCUMENTS

| | | | |
|---|---|---|---|
| CN | 203224848 U | 10/2013 | |
| CN | 203453994 U | 2/2014 | |
| CN | 101075168 B | 4/2014 | |
| CN | 203720812 U | 7/2014 | |
| CN | 203786707 U | 8/2014 | |
| CN | 203786708 U | 8/2014 | |
| CN | 203825586 U | 9/2014 | |
| CN | 204288179 U | 4/2015 | |
| CN | 104808843 A | 7/2015 | |
| CN | 205015574 U | 2/2016 | |
| CN | 205384833 U | 7/2016 | |
| CN | 106648222 A * | 5/2017 | ........... G06F 1/1626 |
| CN | 104391611 A | 9/2017 | |
| DE | 3511330 C2 | 5/1988 | |
| DE | 68902419 T2 | 3/1993 | |
| DE | 69000920 T2 | 6/1993 | |
| DE | 19809934 A1 | 9/1999 | |
| DE | 10026201 A1 | 12/2000 | |
| DE | 10025175 A1 | 12/2001 | |
| DE | 102009003990 A1 | 7/2010 | |
| DE | 102010000473 A1 | 8/2010 | |
| EP | 0845812 B1 | 6/1998 | |
| EP | 0600576 B1 | 10/1998 | |
| EP | 0931731 A1 | 7/1999 | |
| EP | 1471459 | 10/2004 | |
| EP | 1798630 A2 | 6/2007 | |
| EP | 0897161 B1 | 10/2007 | |
| EP | 2088501 A1 | 8/2009 | |
| EP | 1512989 B1 | 9/2009 | |
| EP | 2077490 A3 | 1/2010 | |
| EP | 1126236 B1 | 12/2010 | |
| EP | 2314203 A1 | 4/2011 | |
| EP | 2325735 A2 | 5/2011 | |
| EP | 2339437 A3 | 10/2011 | |
| EP | 2442180 A1 | 4/2012 | |
| EP | 2466429 A1 | 6/2012 | |
| EP | 2479642 A1 | 7/2012 | |
| EP | 1457870 B1 | 8/2012 | |
| EP | 2565770 A2 | 3/2013 | |
| EP | 2765622 A2 | 8/2014 | |
| EP | 2778849 A1 | 9/2014 | |
| EP | 2515216 A1 | 3/2016 | |
| EP | 3535640 A1 | 9/2019 | |
| FR | 2172828 A1 | 10/1973 | |
| FR | 2617619 B1 | 1/1990 | |
| FR | 2614711 B1 | 3/1992 | |
| FR | 2617620 B1 | 9/1992 | |
| FR | 2676275 A1 | 11/1992 | |
| GB | 1380144 A | 1/1975 | |
| GB | 2131544 B | 3/1986 | |
| GB | 2204126 A | 11/1988 | |
| GB | 2263765 | 8/1993 | |
| JP | S62159213 A | 7/1987 | |
| JP | H05190066 A | 7/1993 | |
| JP | 2000506655 A | 5/2000 | |
| JP | 2000172438 A | 6/2000 | |
| JP | 2000259334 A | 9/2000 | |
| JP | 2000293311 A | 10/2000 | |
| JP | 2003330603 A | 11/2003 | |
| JP | 2005004278 A | 1/2005 | |
| JP | 2008506173 A | 2/2008 | |
| JP | 2011530124 A | 12/2011 | |
| JP | 2015158831 A | 2/2018 | |
| KR | 100359400 | 7/2001 | |
| KR | 100940435 | 2/2010 | |
| KR | 101081586 B1 | 11/2011 | |
| KR | 20150125374 A | 11/2015 | |
| TW | M517370 U | 2/2016 | |
| WO | WO 1984/003186 A1 | 8/1984 | |
| WO | WO 1999/046602 A1 | 9/1999 | |
| WO | WO 01/127867 A1 | 4/2001 | |
| WO | WO 01/84251 A2 | 11/2001 | |
| WO | WO 02/35460 A1 | 5/2002 | |
| WO | WO 02/077915 A2 | 10/2002 | |
| WO | WO 02/095668 A1 | 11/2002 | |
| WO | WO 03/076870 A1 | 9/2003 | |
| WO | WO 2004/032210 A | 4/2004 | |
| WO | WO 2004/081502 A2 | 9/2004 | |
| WO | WO 2004/081956 A2 | 9/2004 | |
| WO | WO 2005/026938 A2 | 3/2005 | |
| WO | WO 2005/029172 A2 | 3/2005 | |
| WO | WO 2005/029395 A2 | 3/2005 | |
| WO | WO 2005/125011 A1 | 12/2005 | |
| WO | WO 2006/095320 A2 | 9/2006 | |
| WO | WO 2006/124551 A2 | 11/2006 | |
| WO | WO 2007/003196 A2 | 1/2007 | |
| WO | WO 2007/058924 A2 | 5/2007 | |
| WO | WO 2007/112742 A1 | 10/2007 | |
| WO | WO 2008/004103 A2 | 1/2008 | |
| WO | WO 2008/007276 A2 | 1/2008 | |
| WO | WO 2008/017077 A2 | 2/2008 | |
| WO | WO 2008/034184 A1 | 3/2008 | |
| WO | WO 2008/039006 A1 | 4/2008 | |
| WO | WO 2008/068607 A2 | 6/2008 | |
| WO | WO 2006/124551 B1 | 7/2008 | |
| WO | WO 2008/017077 A4 | 2/2009 | |
| WO | WO 2009/048365 A1 | 4/2009 | |
| WO | WO 2009/077962 A2 | 6/2009 | |
| WO | WO 2009/102681 A2 | 8/2009 | |
| WO | WO 2009/137355 A2 | 11/2009 | |
| WO | WO 2010/006882 A2 | 1/2010 | |
| WO | WO 2010/006883 A2 | 1/2010 | |
| WO | WO 2010/006884 A2 | 1/2010 | |
| WO | WO 2010/006885 A2 | 1/2010 | |
| WO | WO 2010/006886 A2 | 1/2010 | |
| WO | WO 2010/015408 A1 | 2/2010 | |
| WO | WO 2010/046539 A1 | 4/2010 | |
| WO | WO 2010/056177 A1 | 5/2010 | |
| WO | WO 2010/064983 A2 | 6/2010 | |
| WO | WO 2010/081702 A2 | 7/2010 | |
| WO | WO 2010/112404 A1 | 10/2010 | |
| WO | WO 2010/123809 A2 | 10/2010 | |
| WO | WO 2010/134865 A1 | 11/2010 | |
| WO | WO 2011/028169 A1 | 3/2011 | |
| WO | WO 2011/028170 A1 | 3/2011 | |
| WO | WO 2011/049511 A1 | 4/2011 | |
| WO | WO 2011/049512 A1 | 4/2011 | |
| WO | WO 2011/049513 A1 | 4/2011 | |
| WO | WO 2011/057572 A1 | 5/2011 | |
| WO | WO 2011/078769 A1 | 6/2011 | |
| WO | WO 2011/082477 A1 | 7/2011 | |
| WO | WO 2011/119483 | 9/2011 | |
| WO | WO 2011/139213 A1 | 11/2011 | |
| WO | WO 2012/002894 A1 | 1/2012 | |
| WO | WO 2012/010078 A1 | 1/2012 | |
| WO | WO 2012/018176 A2 | 2/2012 | |
| WO | WO 2012/050510 A1 | 4/2012 | |
| WO | WO 2012/082055 A1 | 6/2012 | |
| WO | WO 2012/105893 A1 | 8/2012 | |
| WO | WO 2012/121652 A1 | 9/2012 | |
| WO | WO 2012/158105 A2 | 11/2012 | |
| WO | WO 2012/172302 A1 | 12/2012 | |
| WO | WO 2012/176801 A1 | 12/2012 | |
| WO | WO 2013/036192 A1 | 3/2013 | |
| WO | WO 2013/048312 A2 | 4/2013 | |
| WO | WO 2013/055282 A2 | 4/2013 | |
| WO | WO 2013/062471 A2 | 5/2013 | |
| WO | WO 2013/089622 A2 | 6/2013 | |
| WO | WO 2013/115710 A2 | 8/2013 | |
| WO | WO 2013/133756 A1 | 9/2013 | |
| WO | WO 2013/133757 A2 | 9/2013 | |
| WO | WO 2013/159472 | 10/2013 | |
| WO | WO 2013/176613 A2 | 11/2013 | |
| WO | WO 2013/176614 A2 | 11/2013 | |
| WO | WO 2013/176615 A2 | 11/2013 | |
| WO | WO 2014/044181 A1 | 3/2014 | |
| WO | WO 2014/055809 A1 | 4/2014 | |
| WO | WO 2014/065601 | 5/2014 | |
| WO | WO 2014/086084 A1 | 6/2014 | |
| WO | WO 2014/098742 | 6/2014 | |
| WO | WO 2014/098744 A1 | 6/2014 | |
| WO | WO 2014/104967 A1 | 7/2014 | |
| WO | WO 2014/130515 | 8/2014 | |
| WO | WO 2014/131221 | 9/2014 | |

(56) References Cited

FOREIGN PATENT DOCUMENTS

| WO | WO 2015/123322 A1 | 8/2015 |
|---|---|---|
| WO | WO 2015/175586 A1 | 11/2015 |
| WO | WO 2016/130074 A1 | 8/2016 |
| WO | WO 2017/099657 | 6/2017 |
| WO | WO 2018/096430 A1 | 5/2018 |
| WO | WO 2018/106172 A1 | 6/2018 |
| WO | WO 2018/106176 | 6/2018 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Iizuka, K., "Boundaries, Near-Field Optics, and Near-Field Imaging," Elements of Photonics, vol. 1: In Free Space and Special Media, Wiley & Sons, 2002, in 57 pages.
International Search Report for International App. No. PCT/SE2017/050102, dated Apr. 5, 2017, in 4 pages.
Johnson, M., "Enhanced Optical Touch Input Panel", IBM Technical Disclosure Bulletin, 1985, in 3 pages.
Kak, et al., "Principles of Computerized Tomographic Imaging", Institute of Electrical Engineers, Inc., 1999, in 333 pages.
The Laser Wall, MIT, 1997, http://web.media.mit.edu/~joep/SpectrumWeb/captions/Laser.html.
Liu, J., et al. "Multiple touch points identifying method, involves starting touch screen, driving specific emission tube, and computing and transmitting coordinate of touch points to computer system by direct lines through interface of touch screen," 2007, in 25 pages.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.
Supplementary European Search Report for European App. No. EP 16759213, dated Oct. 4, 2018, in 9 pages.
Extended European Search Report for European App. No. 16743795.3, dated Sep. 11, 2018, in 5 pages.
International Search Report for International App. No. PCT/SE2017/051224, dated Feb. 23, 2018, in 5 pages.
International Search Report for International App. No. PCT/IB2017/057201, dated Mar. 6, 2018, in 4 pages.
Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
Extended European Search Report in European Application No. 17750516.1, dated Jul. 16, 2019 in 5 pages.
Extended European Search Report in European Application No. 16873465.5, date Jun. 25, 2019 in 9 pages.
Report on the Filing or Determination of an Action Regarding a Patent or Trademark. For U.S. Pat. No. 10,282,035, U.S. District of Delaware, dated Dec. 10, 2019, in 1 page.
Civil Cover Sheet *Flatfrog Laboratories AB* v. *Promethean Ltd. and Promethean Inc.*, dated Dec. 10, 2019, in 1 page.
Complaint for Patent Infringement, *Flatfrog Laboratories AB* v. *Promethean Ltd. and Promethean Inc.*, C.A. No. 19-2246, dated Dec. 10, 2019, in 83 pages.
Executed Summons in a Civil Action to Promethean Inc., C.A. No. 19-2246, dated Dec. 10, 2019 in 2 pages.
Summons in a Civil Action to Promethean Inc., C.A. No. 19-2246, dated Dec. 10, 2019 in 2 pages.
Summons in a Civil Action to Promethean Ltd., C.A. No. 19-2246, dated Dec. 10, 2019 in 2 pages.
Defendants' Answer to Second Amended Complaint and Defendant Promethean Inc.'s Counterclaims Against FlatFrog Laboratories Ab., C.A. No. 19-2246, dated May 22, 2020, in 29 pages.
Extended European Search Report for European App. No. 18772370.5, dated Dec. 9, 2020, in 8 pages.
Extended European Search Report for European App. No. 18772178.2, dated Dec. 10, 2020, in 8 pages.
Extended European Search Report for European App. No. 18774232.5, dated Dec. 21, 2020, in 9 pages.
Defendants' Initial Invalidity Contentions, *Flatfrog Laboratories AB* v. *Promethean Ltd. and Promethean Inc.*, C.A. No. 1:19-cv-02246-MN, dated Apr. 23, 2021, in 26 pages.
Notice of Service, *Flatfrog Laboratories AB* v. *Promethean Ltd. and Promethean Inc.*, C.A. No. 1:19-cv-02246-MN, dated Apr. 23, 2021, in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB* v. *Promethean Ltd. and Promethean Inc.*, C.A. No. 1:19-cv-02246-MN, dated Apr. 23, 2021, in 26 pages.
Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories AB* v. *Promethean Ltd. and Promethean Inc.*, C.A. No. 1:19-cv-02246-MN, dated Apr. 23, 2021, in 26 pages.
Exhibit 3A: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.*, C.A. No. 1:19-cv-02246-MN, dated Apr. 23, 2021, in 26 pages.
Exhibit 3B: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.*, C.A. No. 1:19-cv-02246-MN, dated Apr. 23, 2021, in 26 pages.
Exhibit 3C: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.*, C.A. No. 1:19-cv-02246-MN, dated Apr. 23, 2021, in 26 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.*, C.A. No. 1:19-cv-02246-MN, dated Apr. 23, 2021, in 26 pages.
Exhibit 4B: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.*, C.A. No. 1:19-cv-02246-MN, dated Apr. 23, 2021, in 26 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.*, C.A. No. 1:19-cv-02246-MN, dated Apr. 23, 2021, in 26 pages.
Exhibit 5A: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.*, C.A. No. 1:19-cv-02246-MN, dated Apr. 23, 2021, in 26 pages.
Exhibit 5B: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.*, C.A. No. 1:19-cv-02246-MN, dated Apr. 23, 2021, in 26 pages.
Exhibit 5C: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.*, C.A. No. 1:19-cv-02246-MN, dated Apr. 23, 2021, in 26 pages.
Exhibit 6A: Invalidity Claim Chart Against U.S. Pat. No. 10,775,935 Based on U.S. Pre-Grant Pub. No. 2019/0025984 to Weilbacher et

(56) References Cited

OTHER PUBLICATIONS al., *Flatfrog Laboratories AB* v. *Promethean Ltd. and Promethean Inc.*, C.A. No. 1:19-cv-02246-MN, dated Apr. 23, 2021, in 26 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.*, C.A. No. 1:19-cv-02246-MN, dated Apr. 23, 2021, in 26 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.*, C.A. No. 1:19-cv-02246-MN, dated Apr. 23, 2021, in 26 pages.
Exhibit 7A: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.*, C.A. No. 1:19-cv-02246-MN, dated Apr. 23, 2021, in 26 pages.
Exhibit 7B: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.*, C.A. No. 1:19-cv-02246-MN, dated Apr. 23, 2021, in 26 pages.
Exhibit 7C: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.*, C.A. No. 1:19-cv-02246-MN, dated Apr. 23, 2021, in 26 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB* v. *Promethean Ltd. and Promethean Inc.*, C.A. No. 1:19-cv-02246-MN, dated Apr. 23, 2021, in 26 pages.
Exhibit 9: Invalidity Claim Chart Against U.S. Pat. No. 10,739,916 Based on Chinese Utility Model No. CN 203786707 U to Chen et al., *Flatfrog Laboratories AB* v. *Promethean Ltd. and Promethean Inc.*, C.A. No. 1:19-cv-02246-MN, dated Apr. 23, 2021, in 26 pages.
Exhibit 10: Invalidity Claim Chart Against U.S. Pat. No. 10,739,916 Based on International App. Pub. No. WO2014131221 to Chen et al., *Flatfrog Laboratories AB* v. *Promethean Ltd. and Promethean Inc.*, C.A. No. 1:19-cv-02246-MN, dated Apr. 23, 2021, in 26 pages.
Exhibit 11: Invalidity Claim Chart Against U.S. Pat. No. 10,739,916 Based on Chinese Pub. App. No. 104391611 A to Hu et al., *Flatfrog Laboratories AB* v. *Promethean Ltd. and Promethean Inc.*, C.A. No. 1:19-cv-02246-MN, dated Apr. 23, 2021, in 26 pages.
Exhibit 12: Invalidity Claim Chart Against U.S. Pat. No. 10,739,916 Based on Chinese Utility Model No. 203786708 U to Cao, *Flatfrog Laboratories AB* v. *Promethean Ltd. and Promethean Inc.*, C.A. No. 1:19-cv-02246-MN, dated Apr. 23, 2021, in 26 pages.
Exhibit 13: Invalidity Claim Chart Against U.S. Pat. No. 10,739,916 Based on Chinese Utility Model No. 204288179 U to Mo et al., *Flatfrog Laboratories AB* v. *Promethean Ltd. and Promethean Inc.*, C.A. No. 1:19-cv-02246-MN, dated Apr. 23, 2021, in 26 pages.
Defendants Promethean Ltd. and Promethean Inc.'s Preliminary Proposed Claim Constructions, *Flatfrog Laboratories AB* v. *Promethean Ltd. and Promethean Inc.*, C.A. No. 1:19-cv-02246-MN, dated May 24, 2021, in 8 pages.
Defendants' Sur-Reply Claim Construction Brief, *Flatfrog Laboratories AB* v. *Promethean Ltd. and Promethean Inc.*, C.A. No. 1:19-cv-02246-MN, dated Sep. 13, 2021, in 24 pages.
ASTM International, "Standard Specification for Heat-Treated Flat Glass-Kind HS, Kind FT Coated and Uncoated Glass," Designation: C 1048-04, in 7 pages.
British Standard, "Glass in building—Thermally toughened soda lime silicate safety glass," EN 12150-1:2000, ISBN 0 580 36171 3, Aug. 15, 2000, in 28 pages.
Joint Claim Construction Brief, *Flatfrog Laboratories AB* v. *Promethean Ltd. and Promethean Inc.*, C.A. No. 1:19-cv-02246-MN, dated Sep. 20, 2021, in 92 pages.
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 383 pages, (uploaded in 4 parts, part 1 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 383 pages, (uploaded in 4 parts, part 2 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 383 pages, (uploaded in 4 parts, part 3 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 383 pages, (uploaded in 4 parts, part 4 of 4).
International Search Report for International App. No. PCT/SE2018/050871, dated Jan. 25, 2019, in 4 pages.

\* cited by examiner

OPTICAL COMPONENT

TECHNICAL FIELD

The present invention relates to touch-sensing apparatus that operate by propagating light by diffusive light scattering above a panel, and in particular to optical and mechanical solutions for defining the light paths over the panel. The present invention relates furthermore to a method of assembling a touch sensing apparatus.

BACKGROUND ART

In one category of touch-sensitive panels known as 'above surface optical touch systems', a set of optical emitters are arranged around the periphery of a touch surface to emit light that is reflected to travel above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors.

Some prior art systems rely on coupling and propagation of collimated light across the light transmissive panel. Such systems are cumbersome to reliably implement due to the small tolerances with respect to the alignment of the components thereof. E.g. the light emitters and detectors need to be precisely aligned in relation to various lenses and reflect the light via concave and/or convex reflection and/or refraction to get the desired collimation. Such precise alignment may be difficult to achieve in mass production. The use of collimated light also adds to this complexity, which in turn results in a more expensive and less compact system. Furthermore, to reduce system cost, it may be desirable to minimize the number of electro-optical components.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

SUMMARY

Figure 1A:
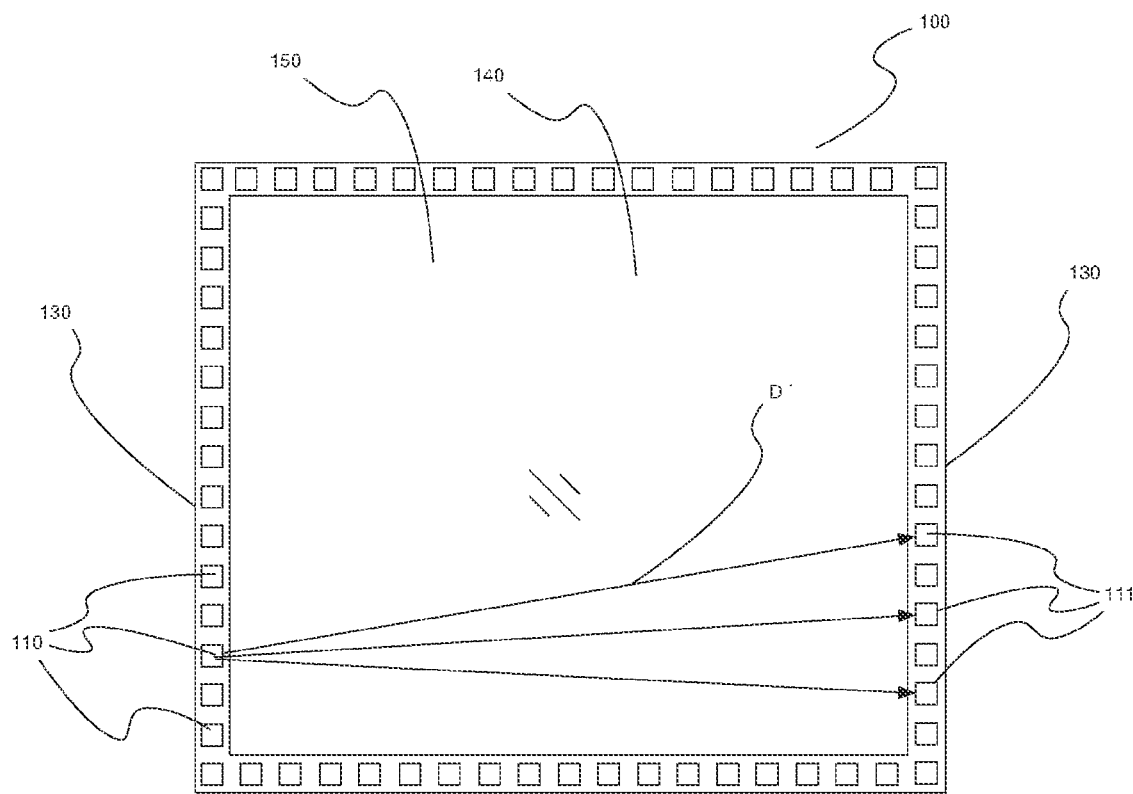
FIGS. 1a, 1b, 1c shows an embodiment with a diffusive transmissive light guide configured to direct and receive light around the edge of the panel.

It is an objective of the invention to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

An aspect of the invention provides a touch sensing apparatus, comprising: a light transmissive panel that defines a touch surface, a plurality of light emitters and detectors arranged along a perimeter of the light transmissive panel, a plurality of optical components arranged along the perimeter of the light transmissive panel, wherein the light emitters are arranged to emit a respective beam of emitted light and the optical components are configured to direct the emitted light to a path across the light transmissive panel. Optionally, optical components comprise a light guide arranged to receive light from the light emitters through a first surface and couple out light travelling in the light guide to the touch surface through a second surface. The second surface may be diffusively transmissive. The light guide may further comprise a reflective surface configured to internally reflect light travelling in the light guide from the first surface to the diffusive surface. The reflective surface may be diffusely reflective, partially diffusely reflective, or specularly reflective.

The reflective surface may be coated by at least one of a high refractive index coating and a scratch resistant coating. At least one of the first and or second surfaces may comprise a dioptric power. At least one of the first and or second surfaces may comprise a corrugation. A ditch may be formed between the second surface and the panel.

At least one protective stop may be mounted to touch sensing apparatus proximal to an optical component and extending further from the touch surface along the normal to the plane of the touch surface than any optical component surface. The optical components may comprise a reflector surface to reflect light from the light emitters to the touch surface, wherein the reflector surface reflects light diffusively, partially diffusively, or specularly.

An angular filter may be arranged between the optical components and touch surface and configured to only allow light travelling within 10 degrees of the plane of touch surface to pass between the touch surface and the optical components.

An elongate channel may be positioned between each light emitter and/or detector and a surface of a corresponding optical component, wherein the elongate channel comprising channel walls, and wherein at least a portion of the channel walls are configured to absorb light. The elongate channel may be formed from a light guide, an airgap, or other light transmissive medium.

The elongate channel may optionally not be straight and/or the channel walls comprise internally reflective surfaces.

DETAILED DESCRIPTION OF EMBODIMENTS

In the following, embodiments will be presented of touch-sensitive apparatus. Throughout the description, the same reference numerals are used to identify corresponding elements.

FIG. 1a illustrates a top plan view of an example of an optical touch-sensitive apparatus. Emitters 110 are distributed around the periphery of panel 150, to project light across the panel 150. Detectors 111 are distributed around the periphery of panel 150, to receive part of the propagating light. The light from each of emitters 110 will thereby propagate to a number of different detectors 111 on a plurality of light paths D. The light paths D may conceptually be represented as "detection lines" that extend across the touch surface 140 of panel 150. Thereby, the emitters 110 and detectors 111 collectively define a grid of detection lines D ("detection grid") on the touch surface 140, as seen in a top plan view. The spacing of intersections in the detection grid defines the spatial resolution of the touch-sensitive apparatus 100, i.e. the smallest object that can be detected on the touch surface 140.

As used herein, the emitters 110 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 110 may also be formed by the end of an optical fibre. The emitters 110 may generate light in any wavelength range. The following examples presume that the light is generated in the infrared (IR), i.e. at wavelengths above about 750 nm. Analogously, the detectors 111 may be any device capable of converting light (in the same wavelength range) into an electrical signal, such as a photo-detector, a CCD device, a CMOS device, etc.

The detectors 111 collectively provide an output signal, which is received and sampled by a signal processor. The output signal contains a number of sub-signals, also denoted "projection signals", each representing the energy of light received by one of light detectors 111 from one of light emitters 110. Depending on implementation, the signal processor may need to process the output signal for separation of the individual projection signals. The projection signals represent the received energy, intensity or power of light received by the detectors 111 on the individual detection lines D. Whenever an object touches a detection line D, the received energy on this detection line is decreased or "attenuated".

The signal processor may be configured to process the projection signals so as to determine a property of the touching objects, such as a position (e.g. in a x,y coordinate system), a shape, or an area. This determination may involve a straight-forward triangulation based on the attenuated detection lines, e.g. as disclosed in U.S. Pat. No. 7,432,893 and WO2010/015408, or a more advanced processing method to recreate a distribution of attenuation values (for simplicity, referred to as an "attenuation pattern") across the touch surface 140, where each attenuation value represents a local degree of light attenuation. The attenuation pattern may be further processed by the signal processor for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In an embodiment, the apparatus 100 also includes a controller which is connected to selectively control the activation of the emitters 110 and, possibly, the readout of data from the detectors 111. Depending on implementation, the emitters 110 and/or detectors 111 may be activated in sequence or concurrently, e.g. as disclosed in U.S. Pat. No. 8,581,884. The signal processor and the controller may be configured as separate units, or they may be incorporated in a single unit. One or both of the signal processor and the controller may be at least partially implemented by software executed by a hardware CPU.

Figure 1B:
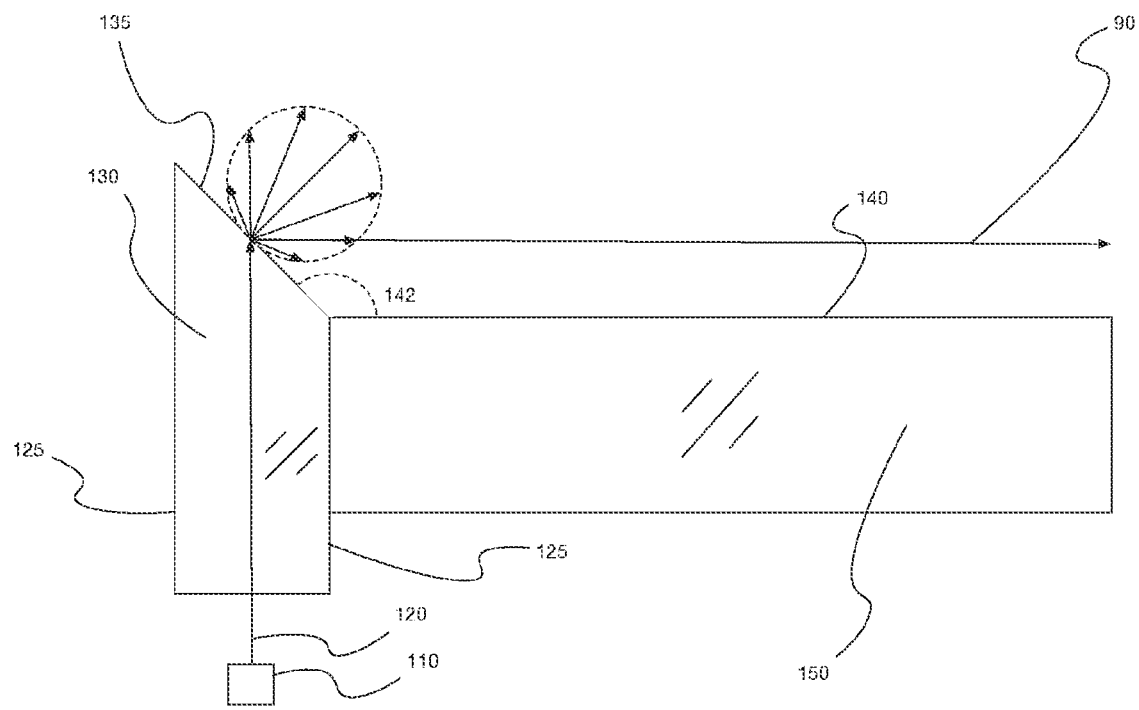
Figure 1C:
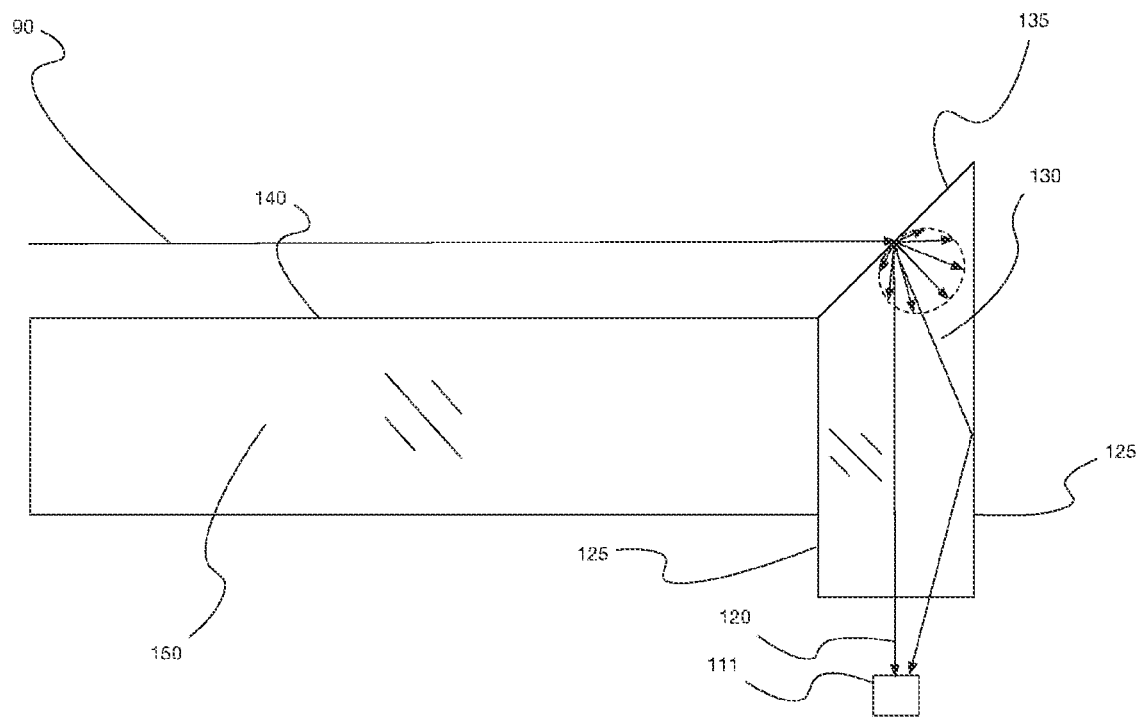

FIG. 1b illustrates an embodiment in which the light 120 emitted by emitter 110 is transmitted through light guide 130. The light exits light guide 130 through diffusive surface 135 and is distributed so that a portion of the light travels along path 90 in a plane substantially parallel with touch surface 140. FIG. 1c shows an opposite side of touch surface 140 where the same light guide 130 plays a reverse role. In FIG. 1c, light 120 is received by surface 135 of light guide 130 which then diffusively transmits the light into light guide 130. The light is then conveyed to detector 111 through light guide 130. Diffusive surface 135 may comprise a coating or other surface finish for providing an optical diffusion. Protective surfaces 125 are provided to reflect light whilst blocking ambient light. Protective surfaces 125 may comprise a white layering, e.g. paint. In one embodiment, the paint comprises titanium dioxide. This embodiment advantageously allows an uncomplicated solution for delivering light from an emitter to touch surface 140. Protective surfaces 125 for suppressing ambient light may be provided for all embodiments provided in the present description that include a light guide.

The optical arrangement shown in all of the figures may be understood to play a transmitting role when the optical arrangement conveys light from an emitter to touch surface 110 (i.e. as explicitly shown and described in FIG. 1b) and a receiving role when the optical arrangement conveys light from touch surface 140 to a detector 111 (i.e. as explicitly shown and described in FIG. 1c). Unless described otherwise, the optical arrangement is understood to be the same for the transmitting role and receiving role. This advantageously allows low production costs for manufacturing of an optical touch sensitive system as the same optical arrangement is used along the periphery of the system regardless of whether it is positioned over or near a detector or an emitter. The direction of light used to describe the function of the optical arrangement may depend on the functions of the individual components of the described embodiment. i.e. Where the key features of an embodiment are important in the receiving role, the direction of light used to describe the function may be according to the receiving role.

In the embodiment shown in FIG. 1b, diffusive surface 135 is positioned at an obtuse angle 142 relative to touch surface 140. This advantageously allows a convenient cleaning edge for removing dust, a reduction in Fresnel reflections, and a smooth transition from the touch surface to a bezel. Diffusive surface 135 is preferably angled at between 130° and 160° relative to touch surface 140.

In all of the embodiments described in this description, the dimensions of the components may be understood to vary. Preferably, the optical components have a height no greater than 10 mm from touch surface 140, a depth of up to than 10 mm below the panel 150, and a distance from an edge of a panel of up to 20 mm.

Figure 2:
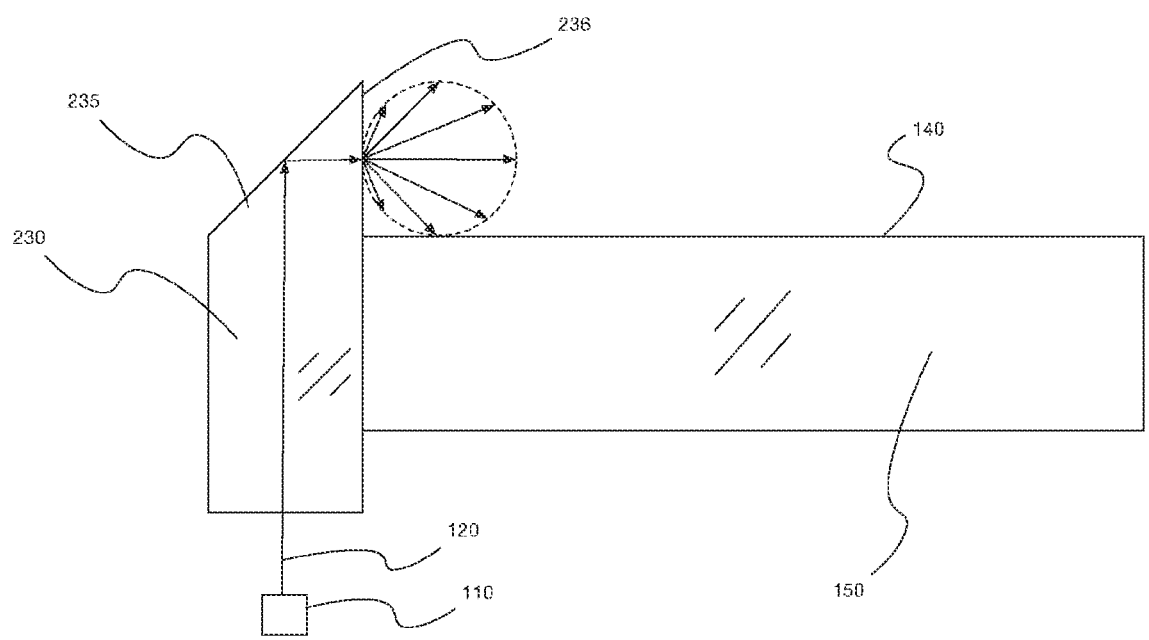
FIG. 2 shows an embodiment with a diffusive transmissive light guide configured to direct and receive light around the edge of the panel.

In an embodiment according to FIG. 2, light 120 emitted by emitter 110 is transmitted through light guide 230. The light internally reflects off surface 235, before exiting light guide 230 through diffusive surface 236. A portion of the light travels across a plane parallel with touch surface 140. Surface 235 may be angled to optimally specularly reflect light towards relative to touch surface 140. Diffusive surface 236 is preferably angled at between 45° and 160° relative to touch surface 140.

Figure 3A:
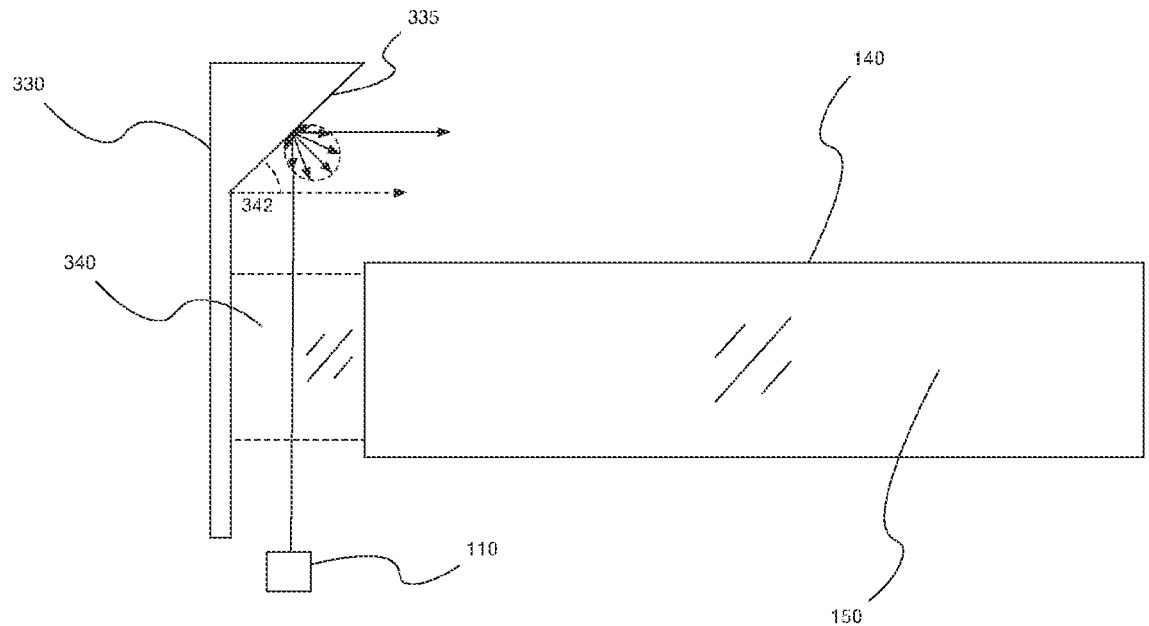
FIGS. 3a, 3b show an embodiment with a diffusive reflective component configured to direct and receive light around the edge of the panel.

In an embodiment according to FIG. 3a, the light emitted by emitter 110 is transmitted through gap 340. Gap 340 may be an air gap or other transmissive medium with a low refractive index. The light totally reflects off diffusive, reflective surface 335 of optical component 330. A portion of the light travels along across a plane parallel with touch surface 140. This advantageously removes the need for transmitting the light through a light guide providing better transmission. Surface 335 may be angled 342 at between 20° and 50° relative to touch surface 140.

Figure 3B:
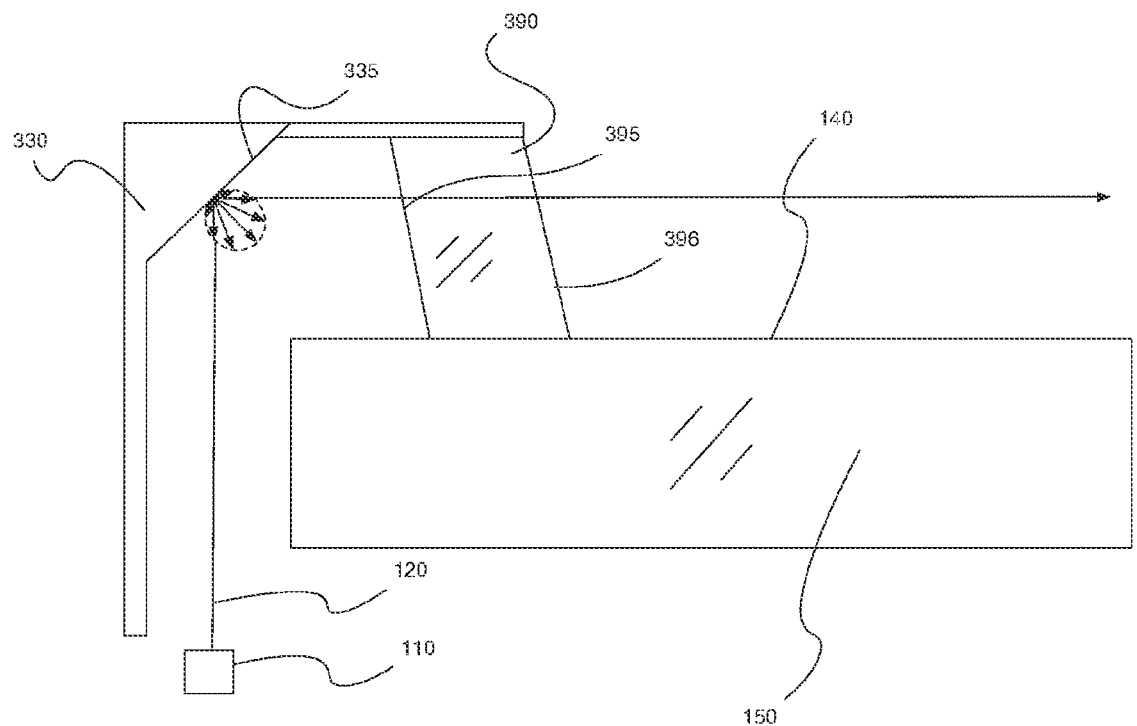

In FIG. 3b, an embodiment similar to that shown in FIG. 3a is shown further comprising dust shield 390 forming a physical barrier preventing dust from reaching diffusive, reflective surface 335 or emitter 110. Dust shield 390 comprises a transparent window through which the light 120 may pass unhindered. Preferably, dust shield 390 forms inside edge 395 and outside edge 396, from touch surface 140 to the top edge of dust shield 390. A slope on outside edge 396 allows dust shield 390 to be effectively wiped clean. Sloping edges 395 and 396 may be angled at between 100° and 80° relative to touch surface 140.

Returning to FIG. 3a, gap 340 may be filled with a dust shield forming a physical barrier preventing dust from reaching below the glass, in much the same way as for embodiment 3b. Positioning the dust shield in this position instead of on touch surface 140 allows the size of the bezel component above touch surface 140 to be smaller than the embodiment shown in FIG. 3b.

Figure 4A:
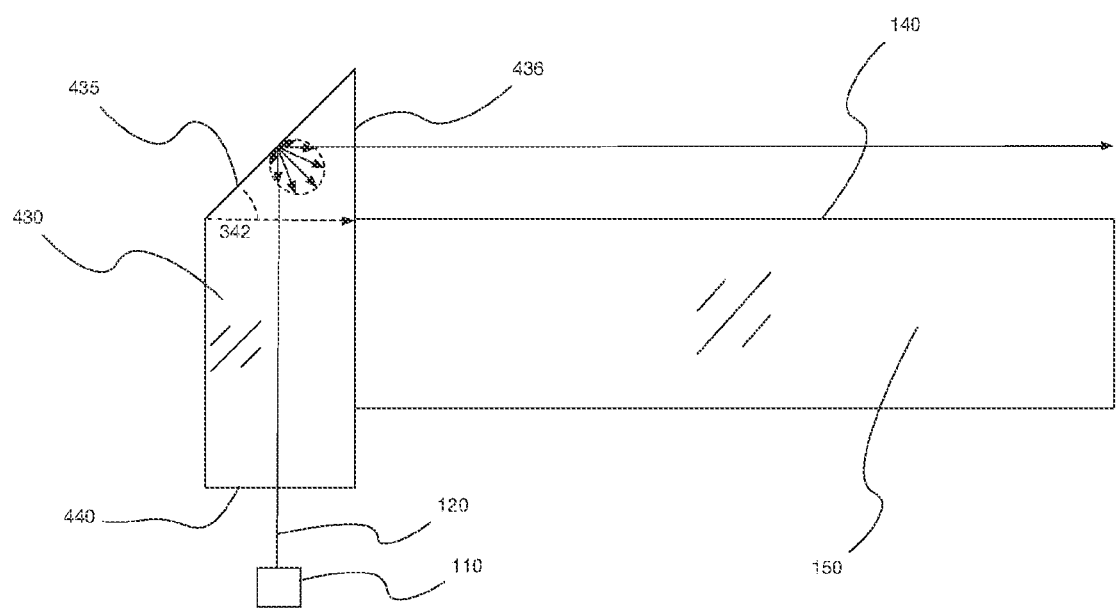
FIGS. 4a, 4b shows another embodiment with a diffusive reflective light guide configured to direct and receive light around the edge of the panel.

In an embodiment according to FIG. 4a, light 120 emitted by emitter 110 is transmitted through light guide 430. The light totally internally reflects off diffusive, reflective surface 435, before exiting light guide 430 through surface 436. This advantageously allows an embodiment similar to the embodiment shown in FIG. 3b without the need for a dust shield. Surface 435 may be angled 342 at between 10° and 50° relative to touch surface 140. Surface 435 may comprise a diffuse paint layer, a diffusive tape layer, or other diffusive reflective coating or layer. Surface 436 is preferably angled at between 100° and 80° relative to touch surface 140. Light guide 430 may be formed via co-extrusion with diffusive materials applied to surface 435.

Figure 4B:
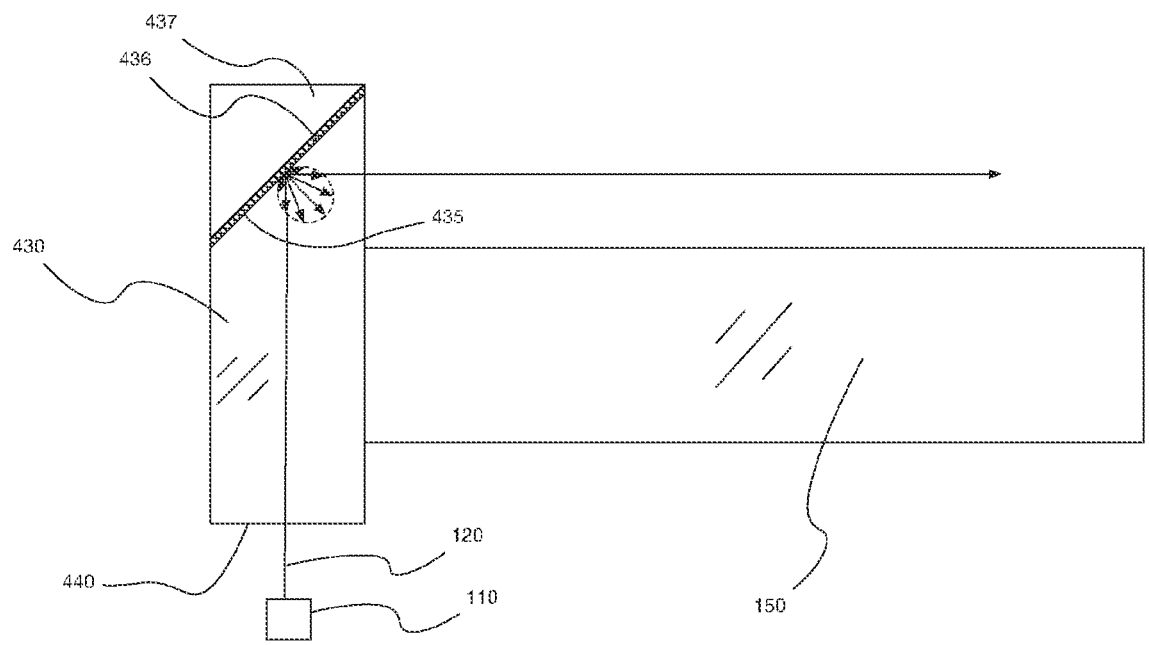

In FIG. 4b, an embodiment similar to that shown in FIG. 4a is shown wherein light guide 430 further comprises extension 437 and diffusive layer 436. In this embodiment, light guide 430 and extension 437 are formed from a single block of material and diffusive layer 436 is formed by modifying the internal structure of the block of material. In one embodiment, gas bubbles are formed in the light guide by focused high intensity laser beams. As the bubbles are optically diffusive, the resultant effect is a plane of bubbles in the light guide forming a diffusive layer. In other embodiments, extension 437 is a separate component from light guide 430 and is attached to light guide 430 during manufacturing. In these embodiments, layer 436 may be formed by etching or by microstructures on a surface of the light guide 430 and/or extension 437.

Figure 5:
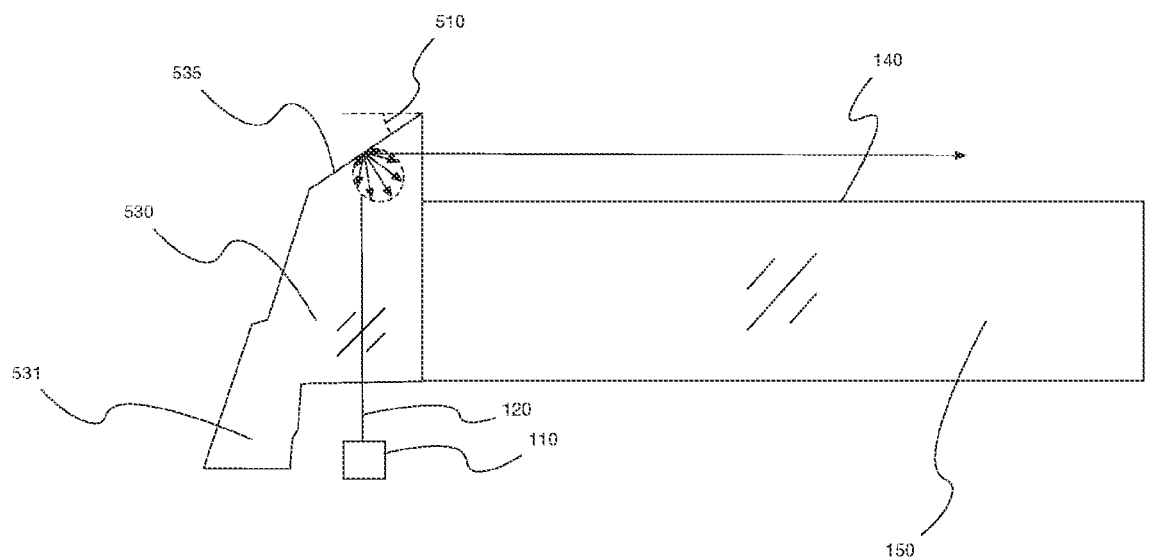
FIG. 5 shows another embodiment with a diffusive reflective light guide configured to direct and receive light around the edge of the panel.

In FIG. 5, an embodiment similar to that shown in FIG. 4a is shown further comprising mounting component 531. This advantageously allows light guide 530 to be clamped to a touch apparatus using a feature that is formed as part of the same material as the light guide. Surface 535 may be angled 510 at between 20° and 50° relative to touch surface 140. At 20°, the surface 535 will collect more light from the emitter 110 whereas at 45°, surface 535 will reflect most of the specular component of light 120 towards the touch surface 140.

Figure 6:
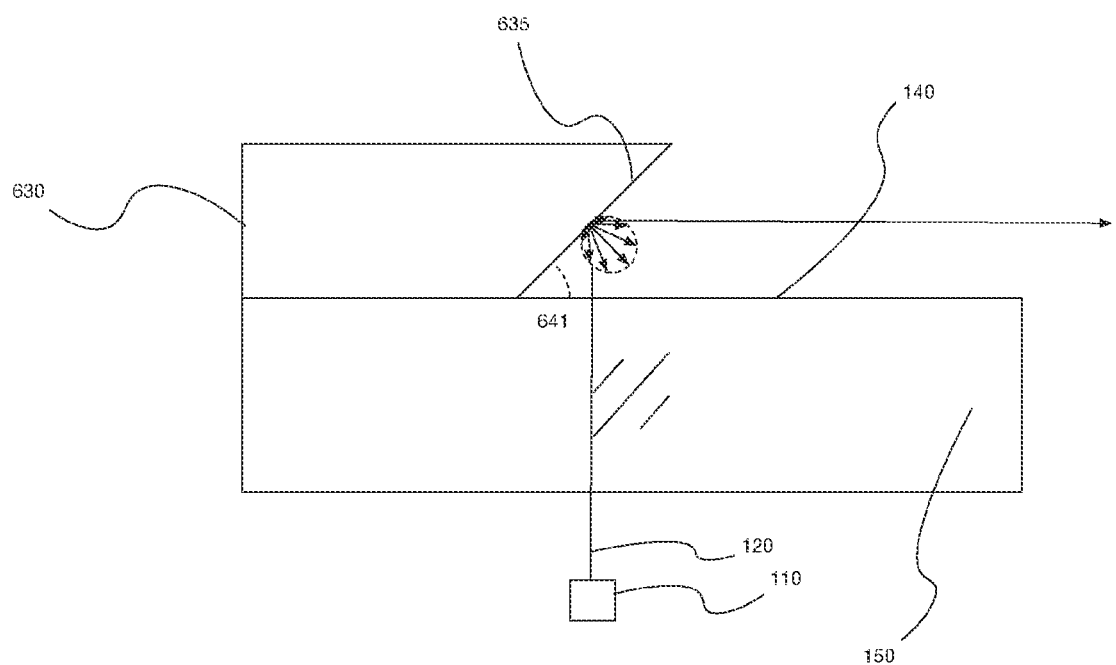
FIG. 6 shows an embodiment with a diffusive reflective component configured to direct and receive light through the panel.

In an embodiment according to FIG. 6, the light 120 emitted by emitter 110 is transmitted through panel 150. The light reflects off diffusive reflective surface 635 of component 630. A portion of the light travels along across a plane parallel with touch surface 140. The feature of transmitting the light from the emitters 110 to diffusive reflective surface 635 through panel 150 has a number of advantages over the solutions presented by the prior art. In particular, manufacture of touch-sensitive apparatus 100 becomes significantly less expensive. This feature allows an arrangement where no components need to be mounted to the edges of the panel 150, allowing expensive finishing (where the panel 150 is formed from glass) to regulate the edges of the glass to be avoided. Furthermore, fastening of the components to panel 150 is simplified and optical tolerances are improved. Surface 635 may be angled 641 at between 20° and 50° relative to touch surface 140.

Figure 7A:
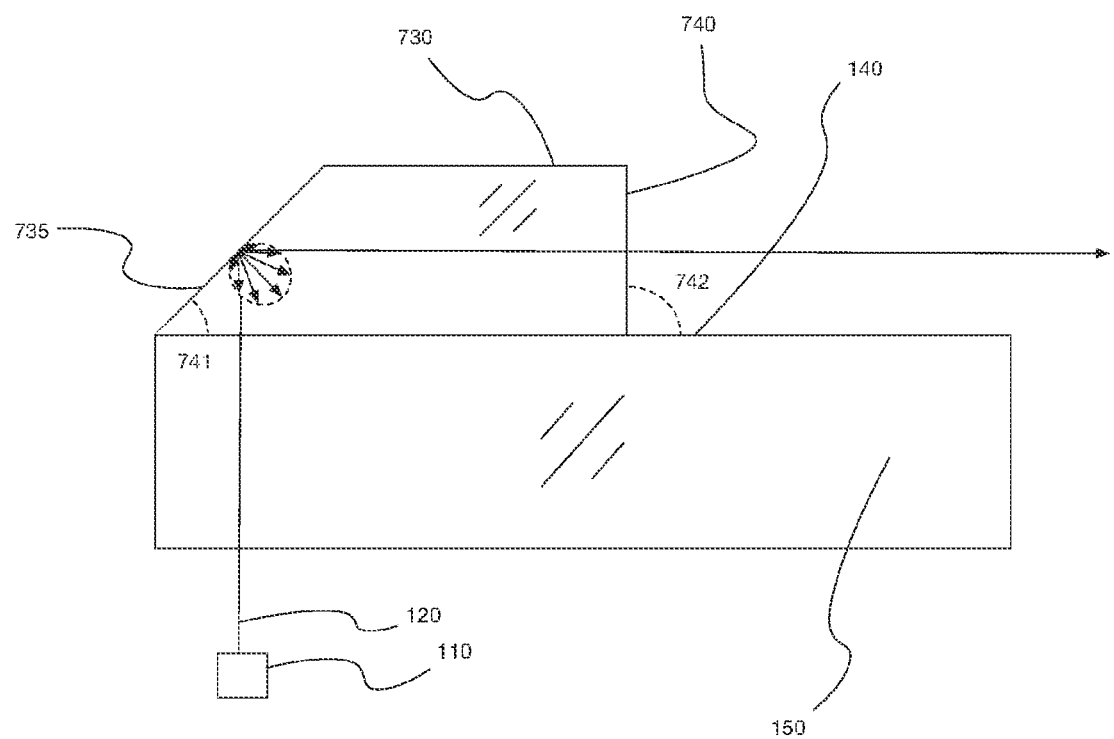
FIGS. 7a, 7b show another embodiment with a diffusive reflective light guide configured to direct and receive light through the panel.

In an embodiment according to FIG. 7a, the light 120 emitted by emitter 110 is transmitted through panel 150. The light internally reflects off diffusive reflective surface 735 of component 730, before exiting light guide 130 through surface 740. This advantageously allows the use of a single component mounted on the touch surface without the need for a dust cover. Surface 735 may be angled 741 at between 20° and 50° relative to touch surface 140. Surface 740 is preferably angled 742 at between 100° and 80° relative to touch surface 140.

Figure 7B:
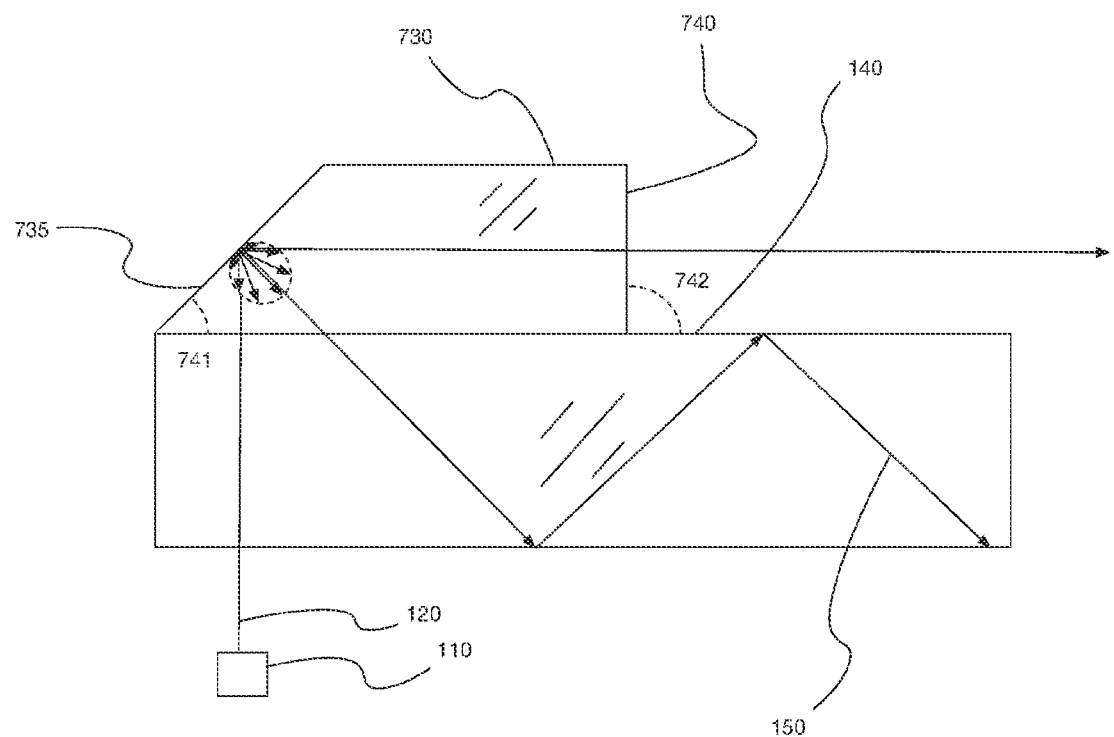

In an embodiment similar to FIG. 7a, FIG. 7b shows an embodiment where the light 120 emitted by emitter 110 is transmitted through panel 150. The light internally reflects off diffusive reflective surface 735 of light guide 730, before exiting light guide 730 through surface 740. A portion of the light also travels through panel 150 via total internal reflection.

Figure 8:
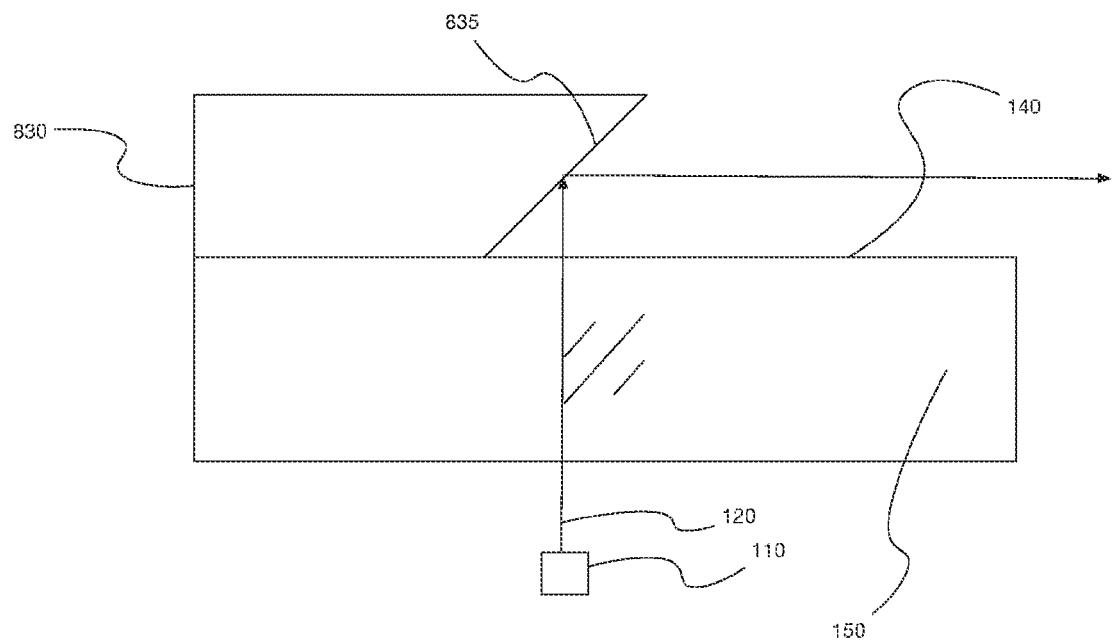
FIG. 8 shows an embodiment with a specular reflective component configured to direct and receive light through the panel.

In an embodiment according to FIG. 8, the light 120 emitted by emitter 110 is transmitted through panel 150. The light reflects off specular or partially specular reflective surface 835 of component 830. The specular reflection of light 120 advantageously allows a much brighter light signal to reach the corresponding detector 111 than in embodiments employing diffusive surfaces above. Surface 835 may comprise a mirror coating. In another embodiment, component 830 is formed from a specularly reflective material, such as a metal.

Figure 9:
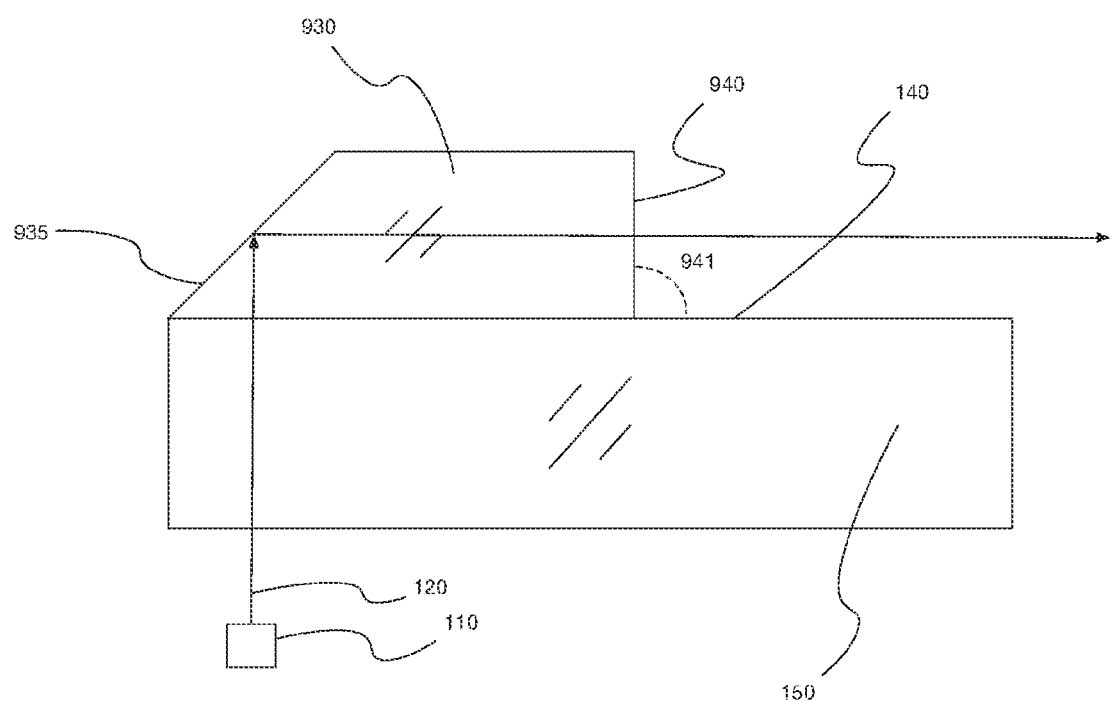
FIG. 9 shows another embodiment with a specular reflective light guide configured to direct and receive light through the panel.

In an embodiment according to FIG. 9, the light 120 emitted by emitter 110 is transmitted through panel 150. The light internally reflects off specular or partially specular reflective surface 935 of component 930, before exiting light guide 930 through surface 940. This advantageously allows an embodiment where the reflective surface (e.g. 935) is set back from the touch surface 140. Surface 940 is preferably angled 941 at between 100° and 80° relative to touch surface 140.

Figure 10:
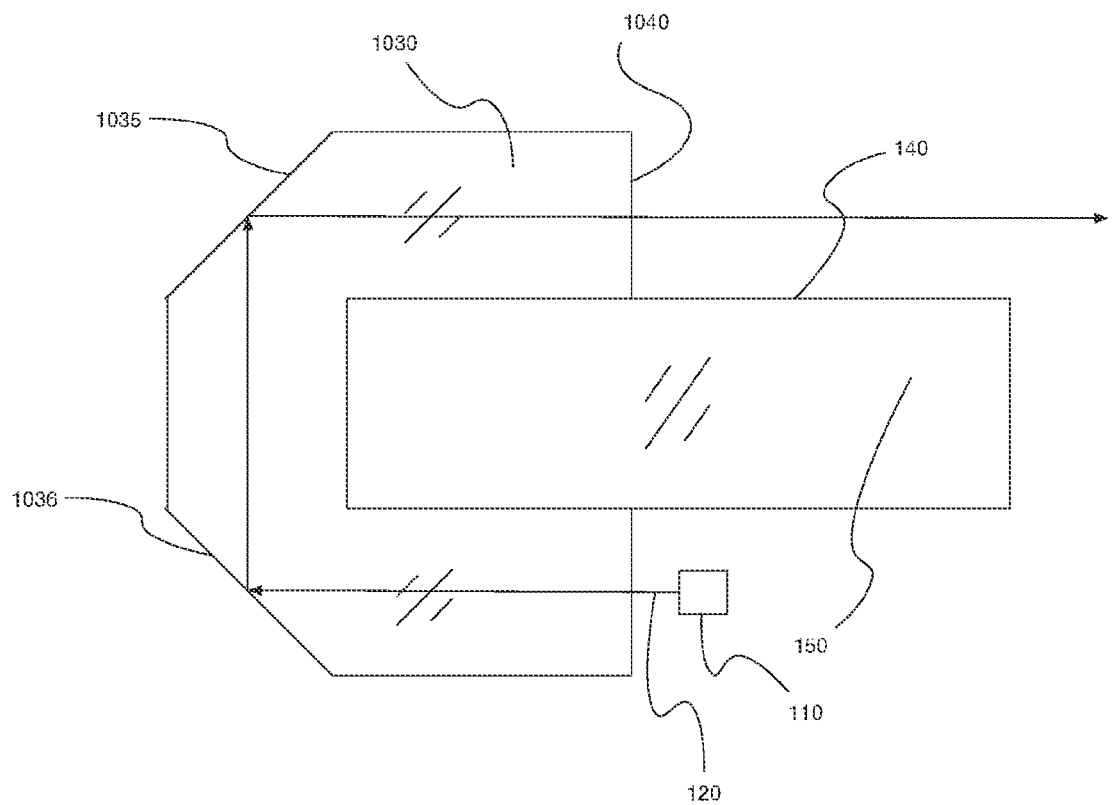
FIG. 10 shows another embodiment with multiple specular reflective light guides configured to direct and receive light around the edge of the panel.

In an embodiment according to FIG. 10, the light 120 emitted by emitter 110 is transmitted through light guide 1030. The light internally reflects off specular or partially specular reflective surface 1036 of light guide 1030. The light then internally reflects off specular or partially specular reflective surface 1035, before exiting light guide 1030 through surface 1040. This U-shaped configuration of light guide 1030 advantageously allows a light guide 1030 to be clamped onto an edge of the glass.

Figure 11:
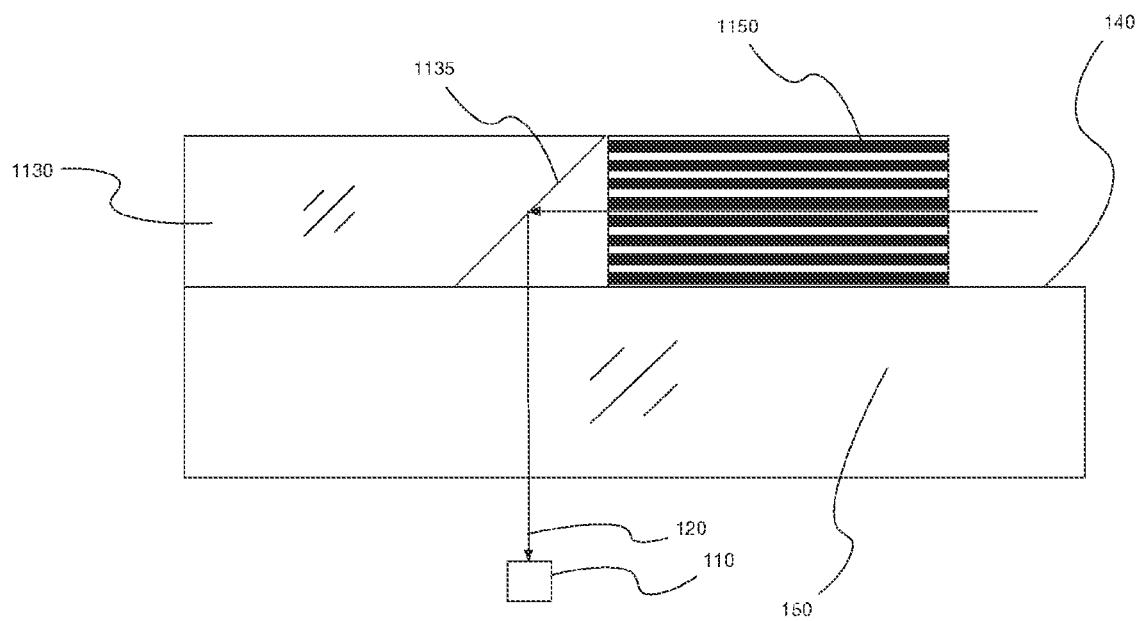
FIG. 11 shows an embodiment with a reflective component comprising an angular filter.

In FIG. 11, an embodiment similar to that shown in FIG. 8 is shown further comprising angular filter 1150. The light 120 from touch surface 140 is filtered by angular filter 1150 to allow only light within a narrow angular range to reach specular or partially specular reflective surface 1135. The light 120 is then reflected by surface 1135 of component 1130 before being received by detector 111 through panel 150. Angular filter 1150 advantageously ensures a much narrower angular spectrum of light to reach detector 111, allowing significant suppression of ambient light noise. This is especially relevant to the specular embodiments described herein. Angular filters 1150 may be applied to any of the embodiments shown in the present description to filter light reaching the optical component from touch surface 140. Angular filters 1150 may also be applied between the optical components and the emitters 110/detectors 111. In an embodiment, the angular filters are manufactured by producing a stack of alternating IR transmissive (e.g. PMMA sheets) and IR blocking material. The layers are laminated together. The stack may then be stretched in a guided manner and cut into optical components.

Figure 12A:
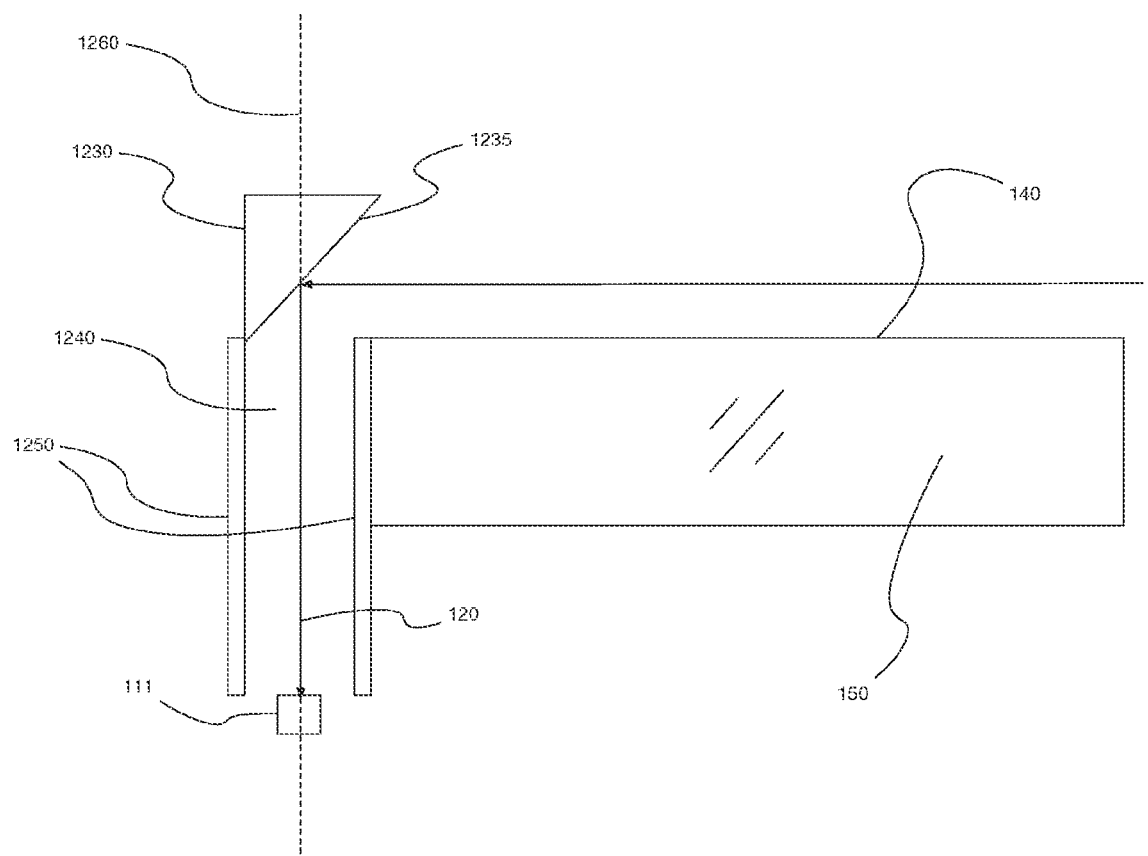
FIG. 12a shows an embodiment with a reflective component and an elongate channel having light absorbing walls.

In an embodiment according to FIG. 12a, the light 120 is received by surface 1235 of optical component 1230 from touch surface 140 which then reflects the light to detector 111 via channel 1240 having a channel axis 1260. Channel 1240 may comprise an air gap or other transmissive medium. Channel 1240 may comprise one or more light absorbent walls 1250 configured to absorb light travelling at an angle sufficiently deviant from the angle of channel axis 1260. This advantageously allows angular filtering of ambient light.

Figure 12B:
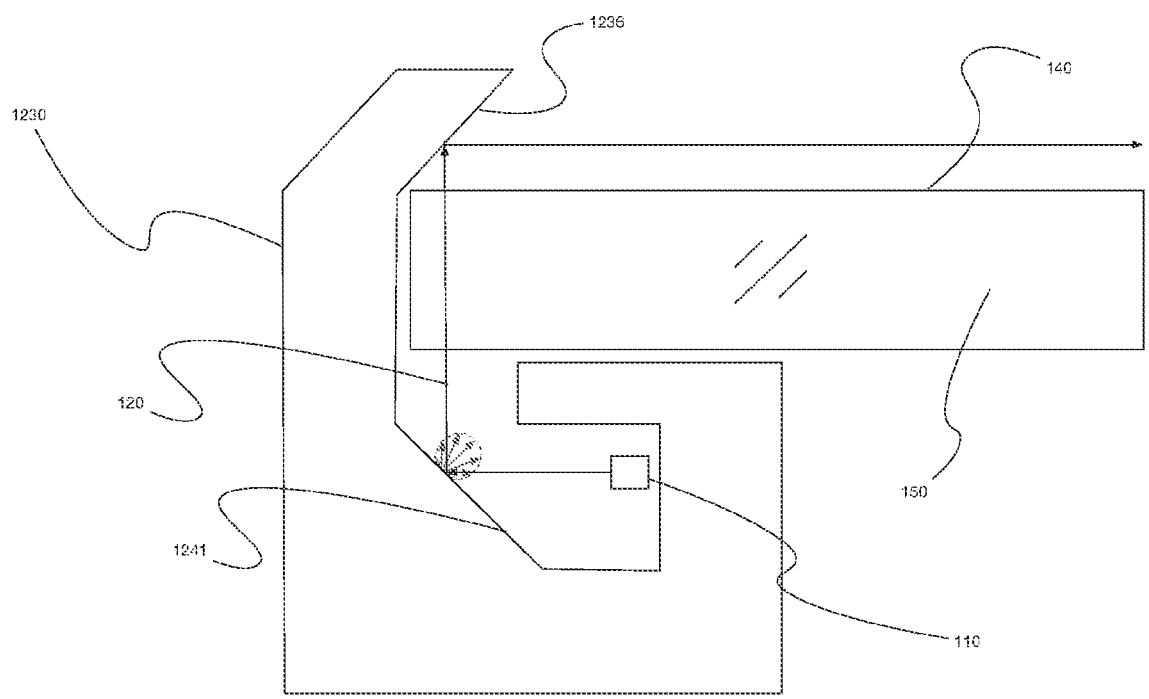
FIG. 12b shows an embodiment with a diffusive surface and a second reflective surface.
Figure 13A:
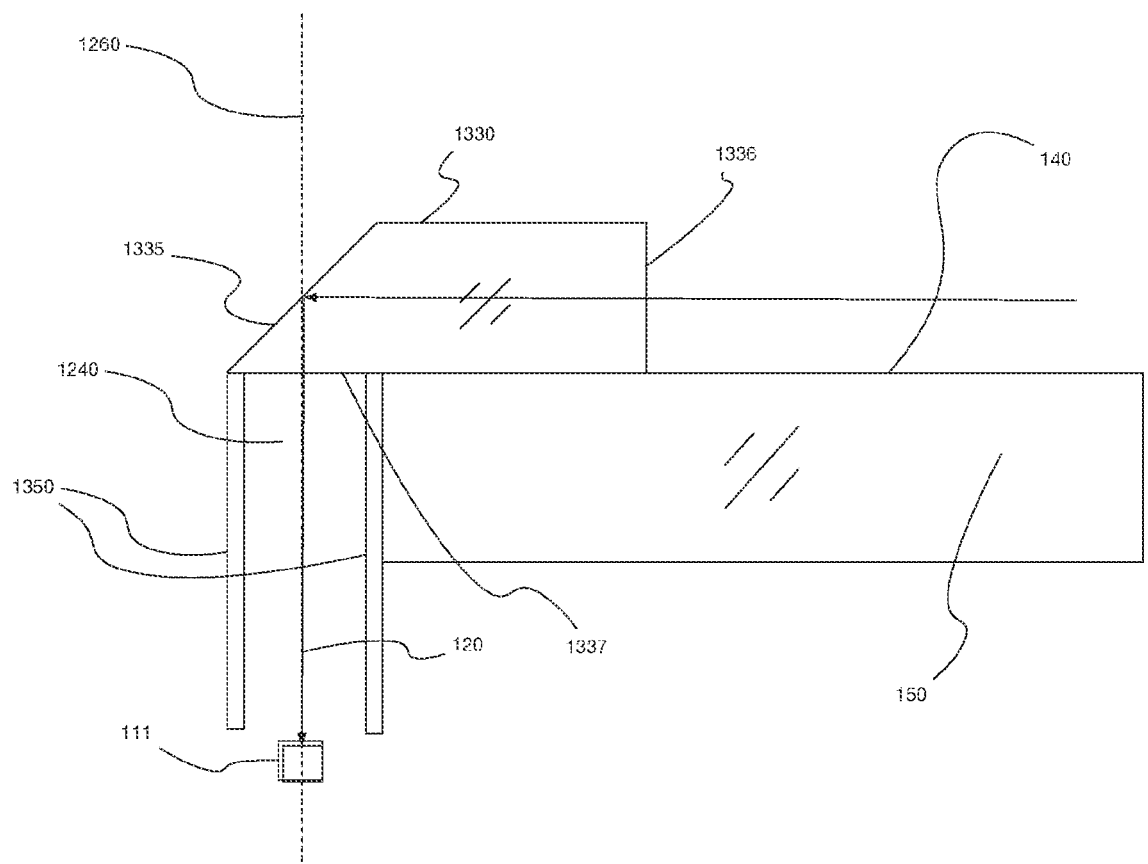
FIGS. 13a, 13b show an embodiment with a reflective light guide incorporating an elongate channel having light absorbing walls.

In an embodiment according to FIG. 12b, the light 120 is emitted from emitter 110 onto surface 1241 and then directed up through panel 150 to surface 1236 before being directed out across touch surface 140. Surface 1241 is a diffusive, preferably matte surface, causing a component of light 120 to be scattered. Preferably, surface 1241 comprises a matte paint, matte diffuser film, or matte surface treatment. Surface 1236 is a mirror surface providing high quality, specular reflection to light 120 of above 50%. Preferably, specular reflection of light 120 is above 60%. Surface 1236 is preferably angled at 45° from the plane of touch surface 140 with a range of ±15°. In one embodiment, surface 1236 is angled a small distance from 45° to avoid unwanted optical effects resulting from light bouncing off other surfaces of the touch system. Preferably, surface 1236 is angled between 0.5° and 3° from 45°. i.e. Between 42° and 44.5° or between 45.5° and 48°. Where optical component 1230 is an anodized extruded component made from aluminium or other suitable metal, mirrored surface 1236 may be formed through diamond cut milling of component 1230 to produce the mirrored finish. Alternatively, a mirror film may be applied to component 1230. In FIG. 13a, an embodiment similar to that shown in FIG. 12 is shown but wherein the light enters light guide 1330 internally through surface 1336, reflects off specular or partially specular reflective surface 1335, before exiting light guide 1330 through surface 1337. In combination with channel 1240, this advantageously allows light guide 1330 to block dust from reaching detector 111. Surface 1336 may be angled at between 80° and 100° relative to touch surface 140.

Figure 13B:
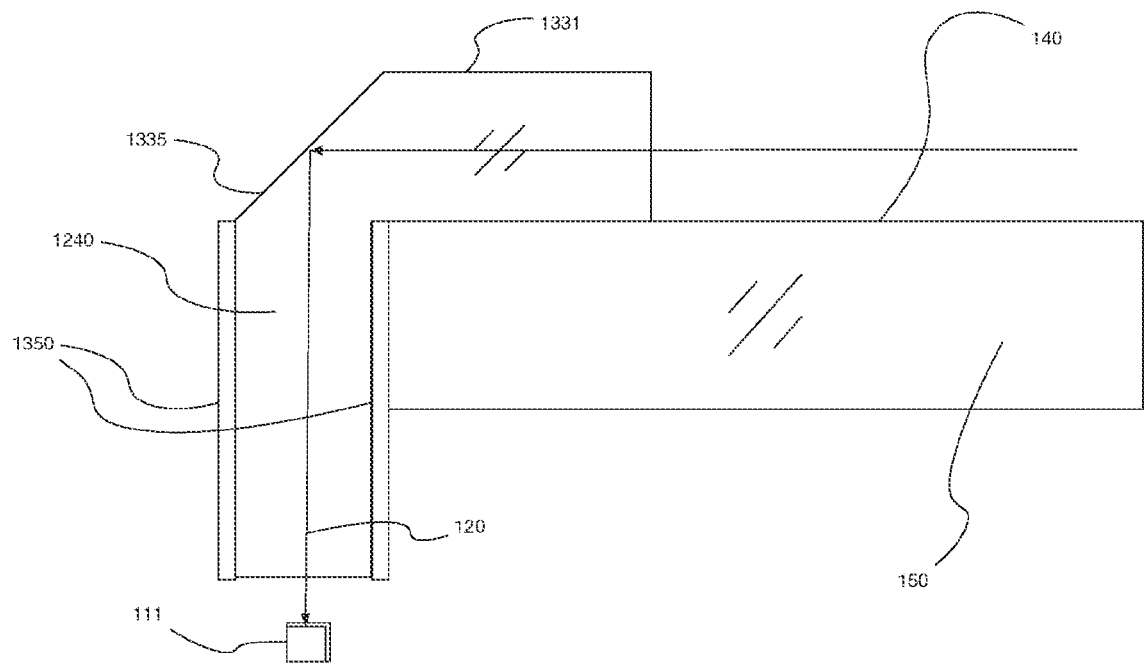

In FIG. 13b, an embodiment similar to that shown in FIG. 13a is shown in which channel 1240 comprises a light transmissive material having a similar refractive index to component 1331. Alternatively, light guide 1331 and channel 1240 are formed from a continuous light guide component. This advantageously allows light guide 1331 to be easily clamped to the glass, improving tolerances.

Figure 14:
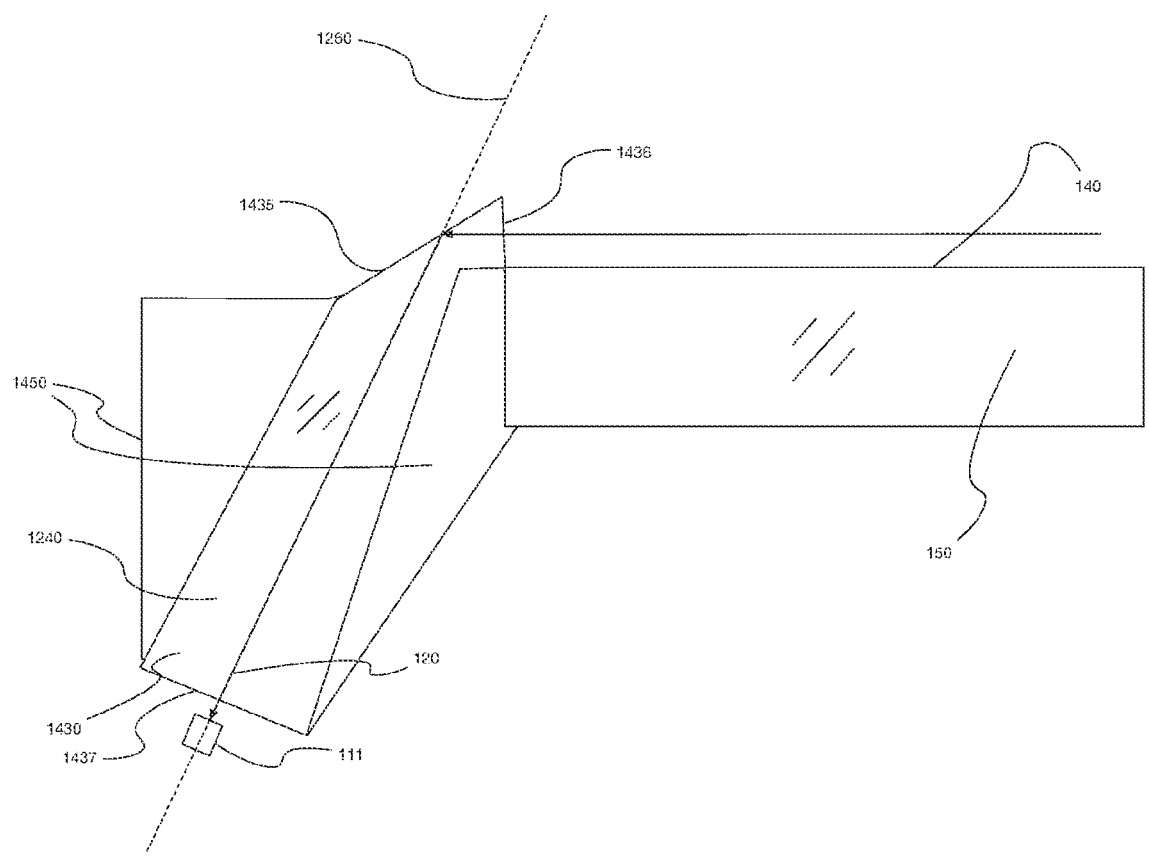
FIG. 14 shows another embodiment with a reflective light guide incorporating an elongate channel having light absorbing walls.

In FIG. 14, an embodiment similar to that shown in FIG. 13b is shown where light guide 1330 and channel 1240 are formed from a continuous light guide component 1430. This advantageously prevents any paths for ambient light to reach detector through surface 1435. The light enters light guide 1430 internally through surface 1436, reflects off specular or partially specular reflective surface 1435, before exiting light guide 1430 through surface 1437. Support components 1450 may be used to mount light guide 1430 to an external frame (not shown) and to panel 150. Support components 1450 may comprise a light absorbent material and perform essentially the same optical function as light absorbent surfaces 1250 in earlier embodiments.

Figure 15:
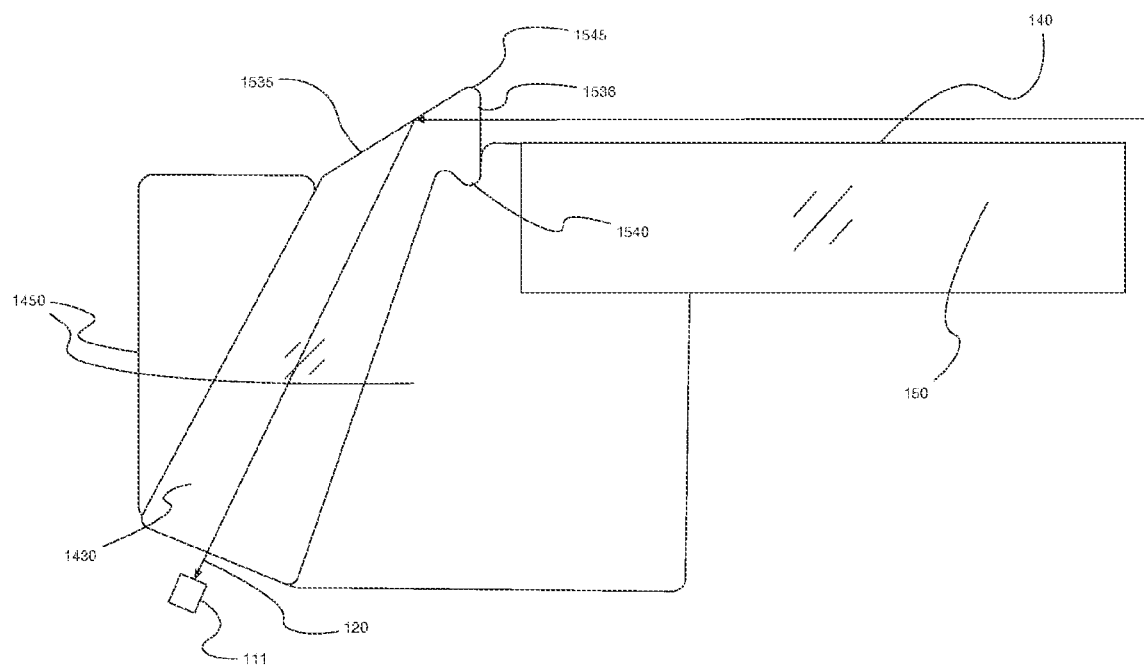
FIG. 15 shows another embodiment with a reflective light guide incorporating an elongate channel having light absorbing walls.

In FIG. 15, an embodiment similar to that shown in FIG. 14 is shown where light guide component 1430 has top edge 1545 having a radius. Due to manufacturing limitations, it difficult to ensure a sharp edge. A sharp edge may also be dangerous to a user. Therefore, a radius of the edge is assumed. Although light guide component 1430 may be designed to minimize ambient light from reaching detector 111, the radius of edge 1545 will inevitably allow light from undesirable angles to enter the light guide and consequently reach detector 111. Similarly, an edge 1540 at the bottom of surface 1536 may reflect light at undesirable angles when not perfectly sharp. Consequently, in one embodiment, edge 1540 is positioned below the plane of touch surface 140 and shielded by absorbent material 1450. Preferably, edge 1545 and edge 1540 have a radius of 0.1 mm.

Figure 16:
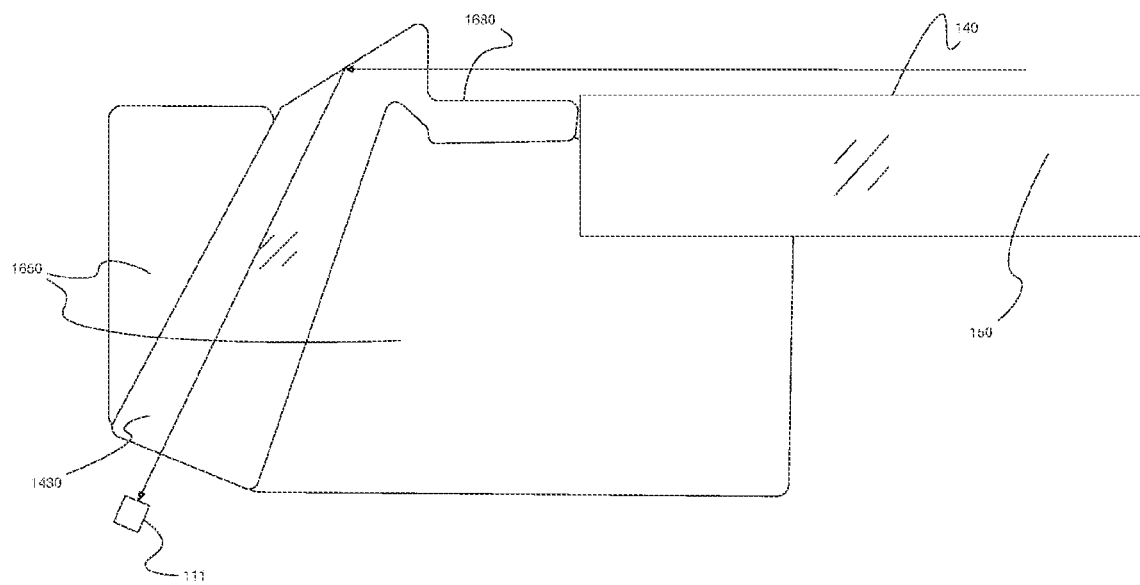
FIG. 16 shows an embodiment with a reflective light guide incorporating a support member.

In FIG. 16, an embodiment similar to that shown in FIG. 14 is shown where light guide component 1430 further comprises extended lip 1680.

Figure 17:
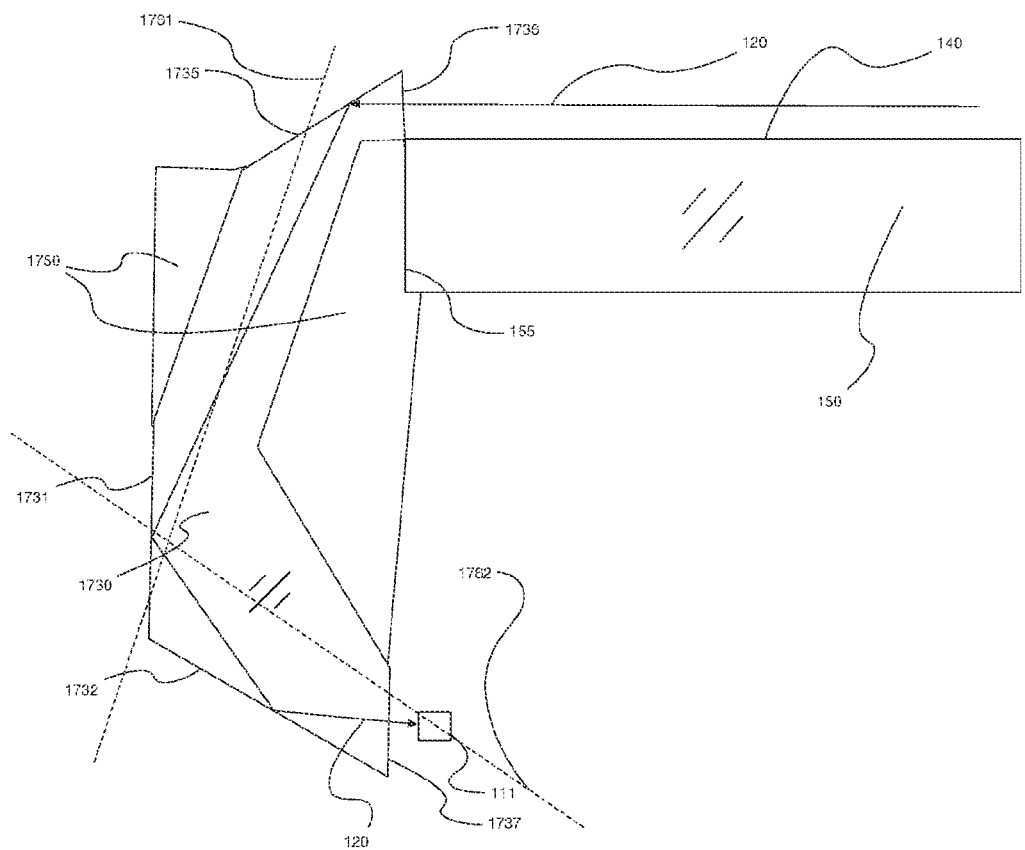
FIG. 17 shows an embodiment with a reflective light guide incorporating an elongate channel having with at least two channel axes.

In FIG. 17, an embodiment similar to that shown in FIG. 14 is shown where light guide component 1730 comprises a channel having at least two channel axes 1761, 1762. In this embodiment, light 120 enters light guide 1730 internally through surface 1736, internally reflects off specular or partially specular reflective surface 1735 as well as surface 1731 and/or surface 1732 before exiting light guide 1730 through surface 1737 to reach detector 111. Light 120 is internally reflected by at least two surfaces before reaching a detector. This advantageously allows the more flexible positioning of emitter/detector components with respect to the panel 150 and the minimisation of the width of components from edge 155.

Figure 18:
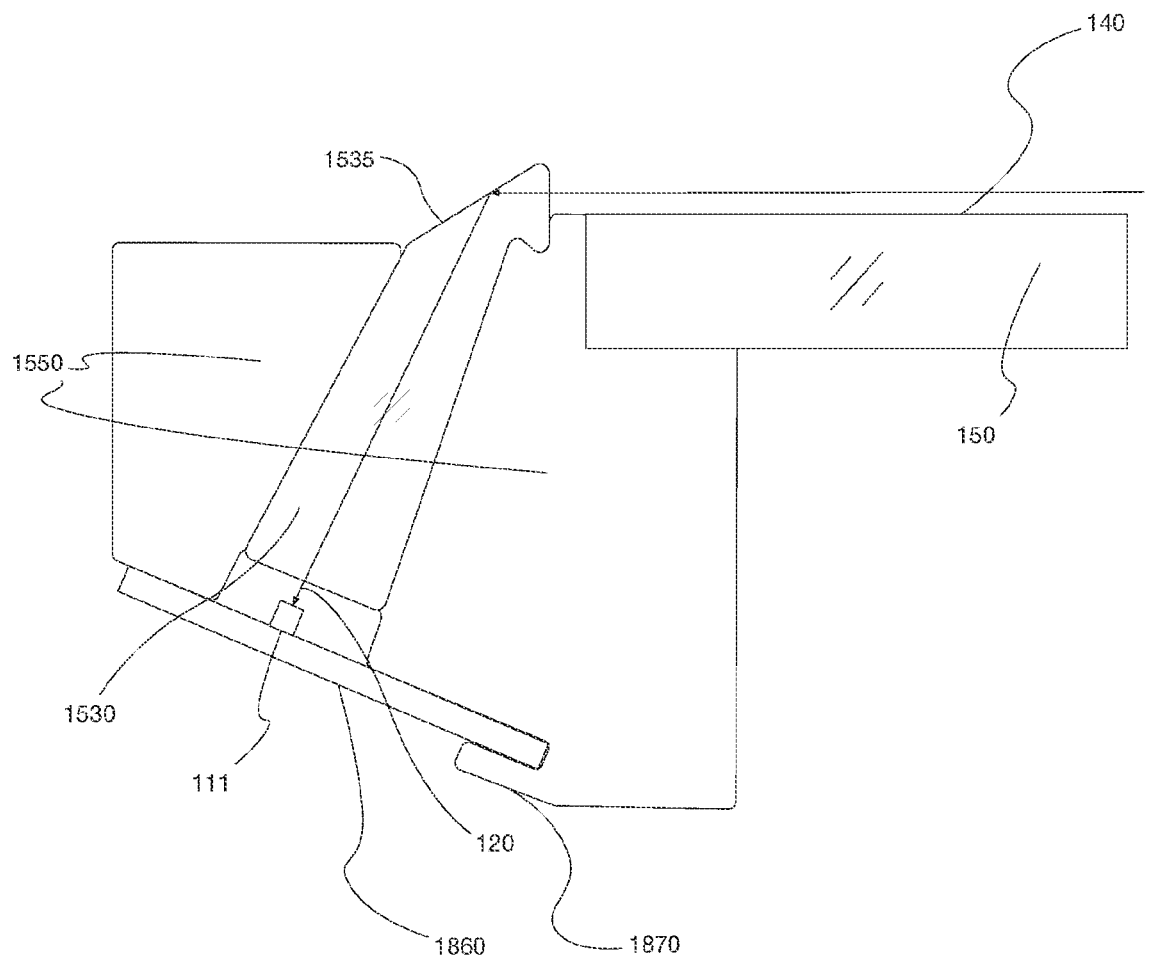
FIG. 18 shows an embodiment with a reflective light guide and a PCB with a mounted emitter/detector component.

In FIG. 18, an embodiment similar to that shown in FIG. 15 is shown where emitters 110 and detectors 111 are mounted on substrate 1860. In this embodiment, support components 1550 comprise support slot 1870, which provide physically supports substrate 1860.

Figure 19:
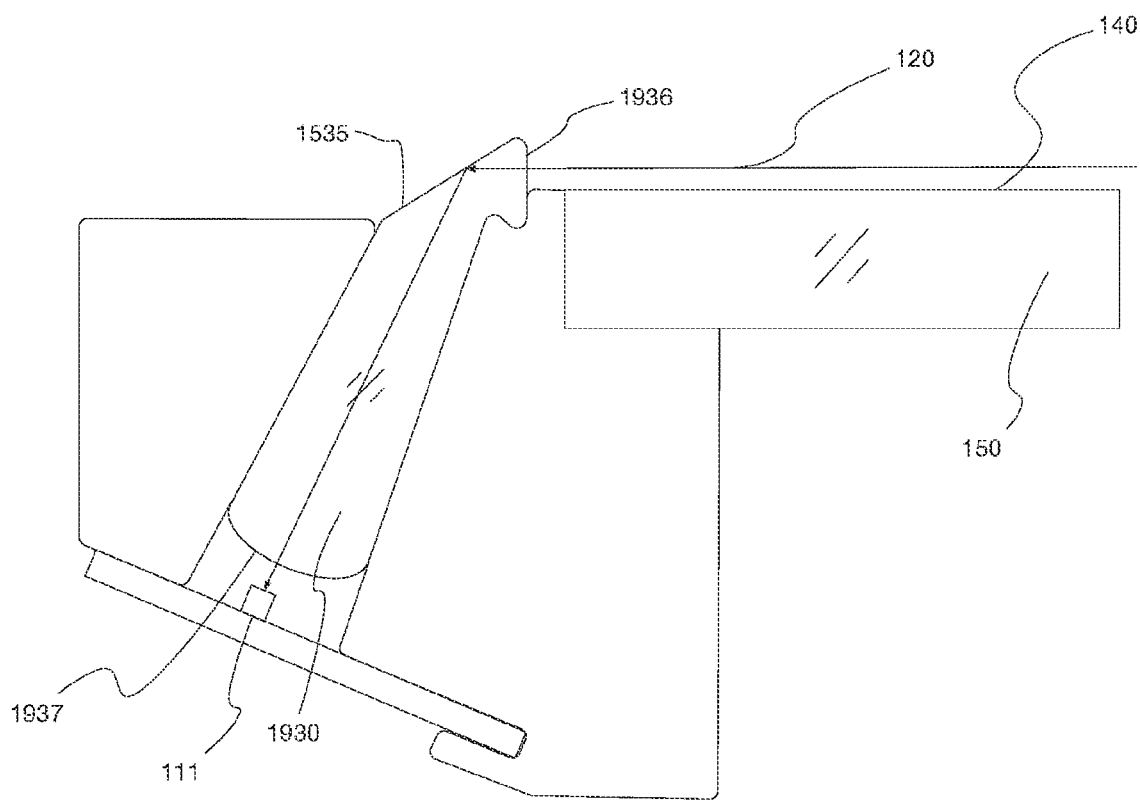
FIG. 19 shows an embodiment with a reflective light guide having a surface providing a dioptric power.

In FIG. 19, an embodiment similar to that shown in FIG. 15 is shown where light guide component 1930 comprises a bottom coupling surface 1937 providing a dioptric power. The light 120 enters light guide 1930 internally through surface 1936 and reflects off specular or partially specular reflective surface 1535. The light then exits light guide 1930 through bottom coupling surface 1937 and is converged on to the detectors 111 by the optical power of bottom coupling surface 1937. In the transmitter role, the light emitted by emitters 110 is substantially columnated by the optical power of bottom coupling surface 1937. This advantageously allows the capture of a larger angular distribution of light 120 from emitter 110 and collimating the light to direct it to surface 1535. This feature of the surface coupling light to a detector or from an emitter having a dioptric power may be applied to any of the embodiments provided in the present description comprising a light guide. The curvature angles are preferably within 5-10 mm per radius of curvature.

Figure 20:
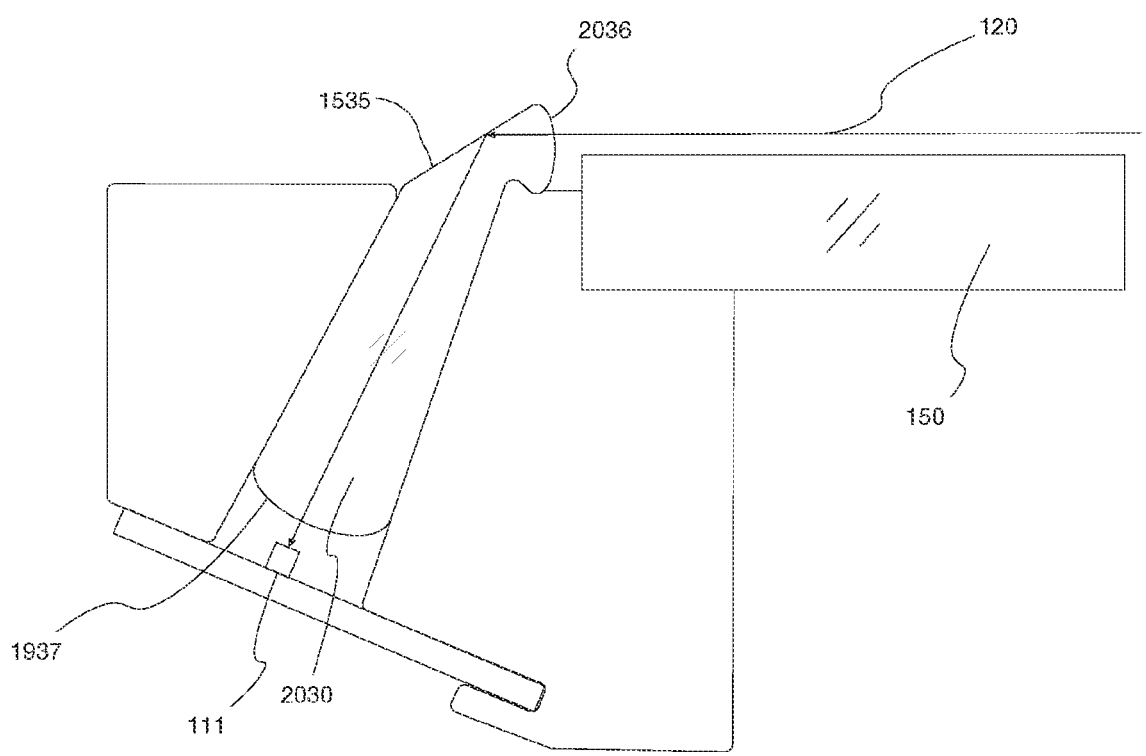
FIG. 20 shows an embodiment with a reflective light guide having a plurality of surfaces providing a dioptric power.

In FIG. 20, an embodiment similar to that shown in FIG. 15 is shown where light guide component 2030 comprises a top coupling surface 2036 providing a dioptric power. The light 120 enters light guide 2030 internally through top coupling surface 2036 and reflects off specular or partially specular reflective surface 1535. The light 120 is substantially columnated by the optical power of top coupling surface 2036 where the power is convex. The light then exits light guide 2030 through bottom coupling surface 1937 and is converged on to the detectors 111 by the optical power of top coupling surface 2037. In the transmitter role, the light emitted by emitters 110 is substantially columnated by the optical power of top coupling surface 1937 where the power is concave. This advantageously spreads out light beam 120 vertically, reducing tolerance problems for component alignment. Where the power is convex, light beam 120 is made narrower but more intense. This feature of the surface 2036 having a dioptric power may be applied to any of the embodiments provided in the present description comprising a light guide. The curvature angles are preferably within 5-10 mm per radius of curvature.

Figure 21:
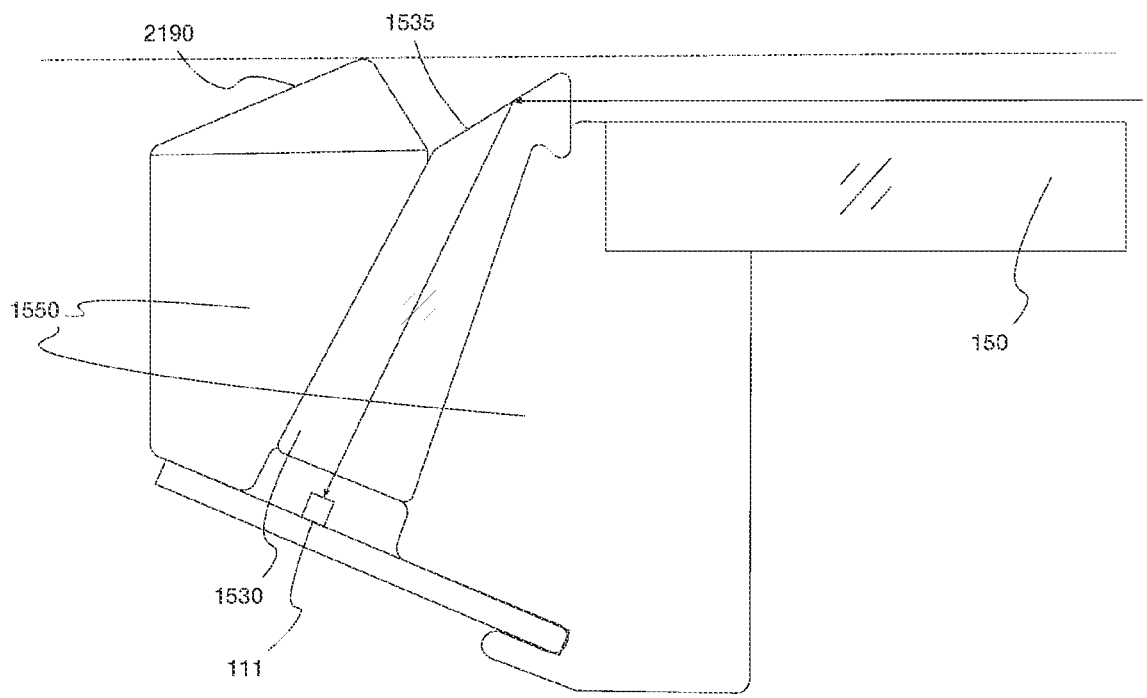
FIG. 21 shows an embodiment with a protective stopping component.

In FIG. 21, an embodiment is shown with a feature that may be added to any other embodiment of the disclosure. Protective stop 2190 may be an extension of support component 1550 or a separate component fixed to support component 1550. Protective stop 2190 provides a physical stop which extends further from the touch surface along the normal to the plane of the touch surface than any light guide component (e.g. 1530 as shown in FIG. 21). This protective stop ensures that if the touch apparatus 100 is placed against a flat surface, e.g. a wall or floor, top surface 1535 of light guide component 1530 will not be scratched or damaged by the flat surface, as protective stop 2190 will hold the touch apparatus 100 and light guide component 1530 away from the flat surface, leaving a gap. Preferably, protective stop 2190 extends at least 0.1 mm further from the touch surface along the normal to the plane of the touch surface than any light guide component.

Figure 22:
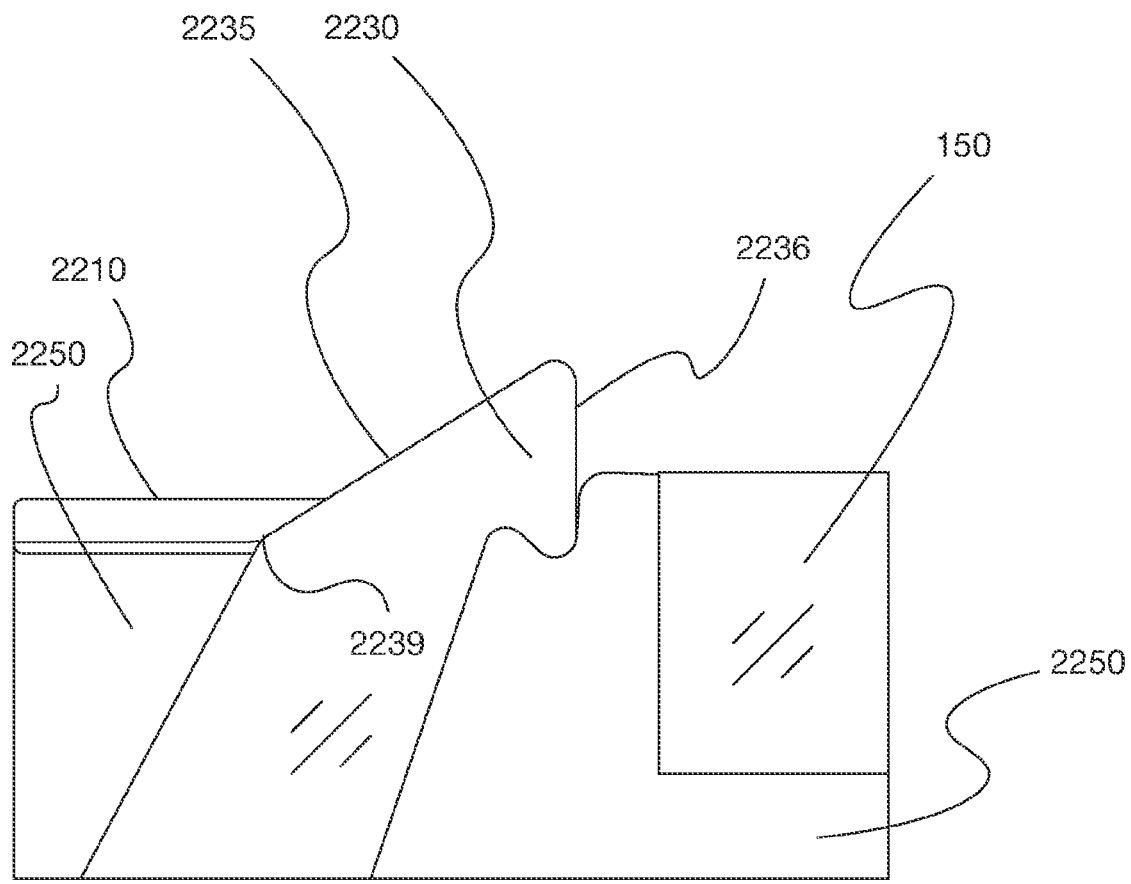
FIG. 22 shows an embodiment with an additional light absorbing layer.

In FIG. 22, an embodiment similar to that shown in FIG. 15 is shown with a zoomed view on top coupling surface 2236, reflective surface 2235, reflective surface edge 2239, light guide 2230, and support components 2250. In this embodiment, an additional light absorbing layer 2210 is provided, wherein light absorbing layer 2210 covers reflective surface edge 2239 and optionally partially overlaps reflective surface 2235. This advantageously allows the reduction of ambient light received through edge 2239 and/or reflected at an undesirable angle from within light guide 2230. This feature may be applied to any of the embodiments provided in the present description comprising a light guide with edges that are exposed to ambient light.

Figure 23:
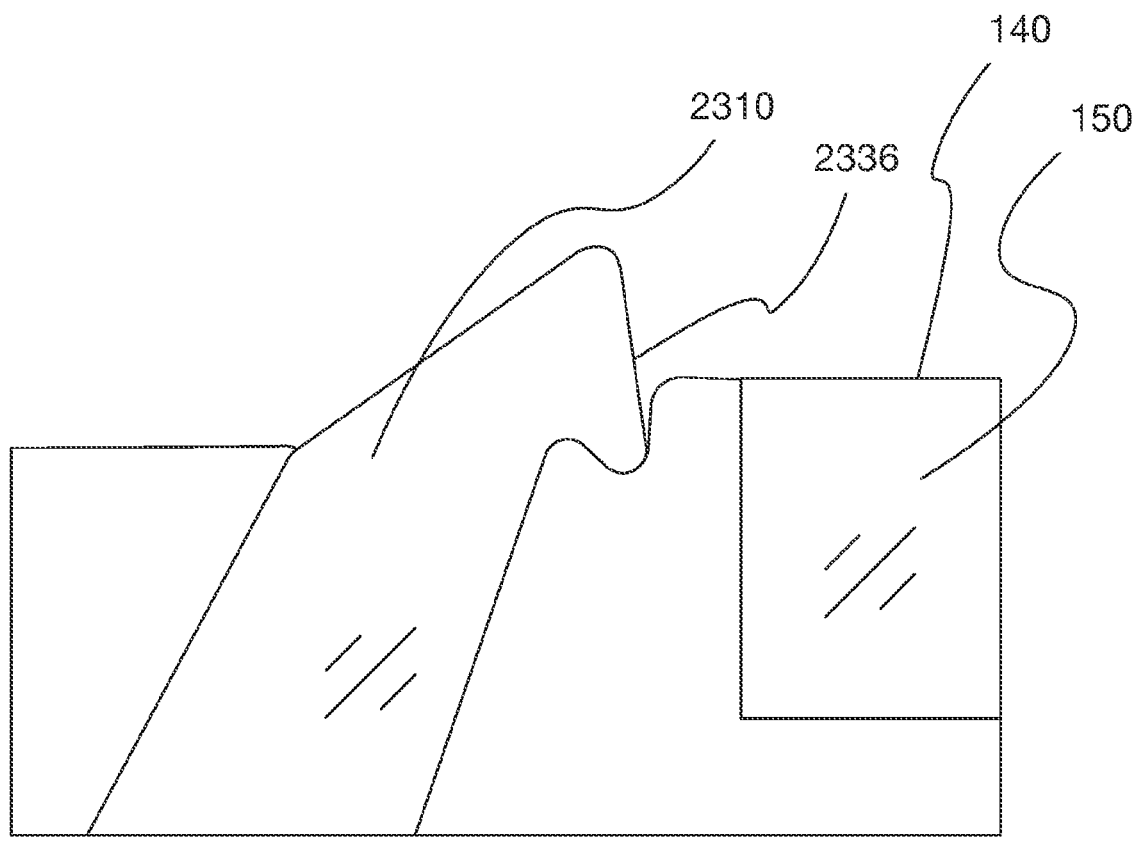
FIG. 23 shows an embodiment with a reflective light guide wherein the surface proximal the panel is slanted.

In FIG. 23, an embodiment similar to that shown in FIG. 22 is shown, wherein top coupling surface 2336 is angled relative to the touch surface 140. Top coupling surface 2336 may be angled at between 100° and 80° relative to touch surface 140. This feature of the surface coupling light to or from the touch surface 140 having an angle may be applied to any of the embodiments provided in the present description comprising a light guide.

Figure 24:
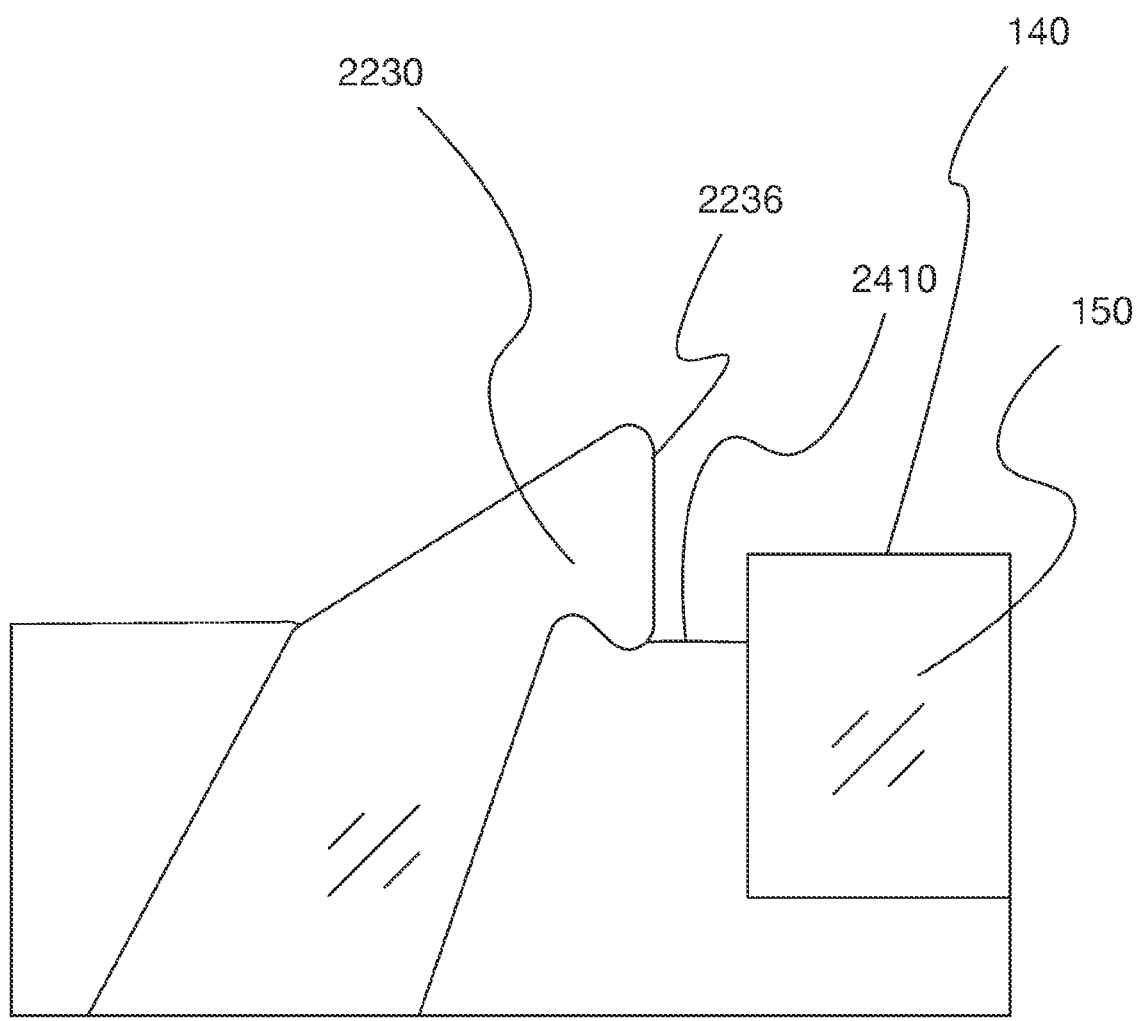
FIG. 24 shows an embodiment comprising a contamination ditch between the light guide and the panel.

In FIG. 24, an embodiment similar to that shown in FIG. 22 is shown, wherein top coupling surface 2236 is spaced from panel 150 to provide ditch 2410. Ditch 2410 advantageously allows dust, liquids, or other debris from contaminating the portion of surface 2236 exposed to touch surface 140. This feature may be applied to any of the embodiments provided in the present description comprising a light guide. Preferably, ditch 2410 extends between 0.01 mm and 2 mm below touch surface 140.

Figure 25:
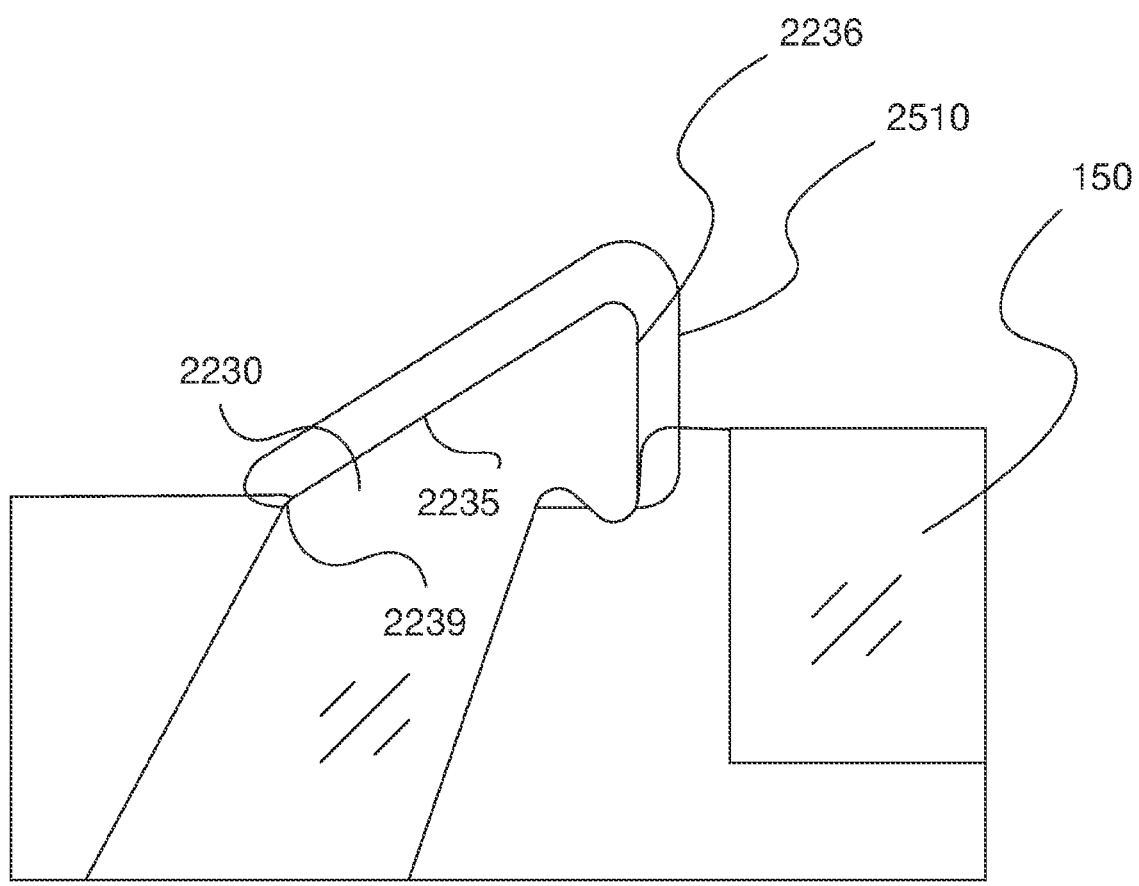
FIG. 25 shows an embodiment with a reflective light guide having a top layer comprising a high refractive index than the light guide.

In FIG. 25, an embodiment similar to that shown in FIG. 22 is shown, wherein reflective surface 2235, reflective surface edge 2239, and/or top coupling surface 2336 are provided with optical layer 2510. Optical layer 2510 has a lower refractive index than light guide 2230 and may comprise fluoro polymer plastics e.g. Teflon and Cytop, dielectric coatings e.g. magnesium fluoride or nanoporous sio₂. Techniques for applying layer 2510 to surface 2235 may include sputter deposition, spray coating, dip coating, physical/chemical vapour deposition. Protective layer 2510 advantageously prevents the frustration of the internal reflection occurring at surface 2235 whilst not affecting the optical properties of transmission at surface 2236. This feature may be applied to any of the embodiments provided in the present description comprising a light guide with surfaces exposed to ambient light.

Figure 26:
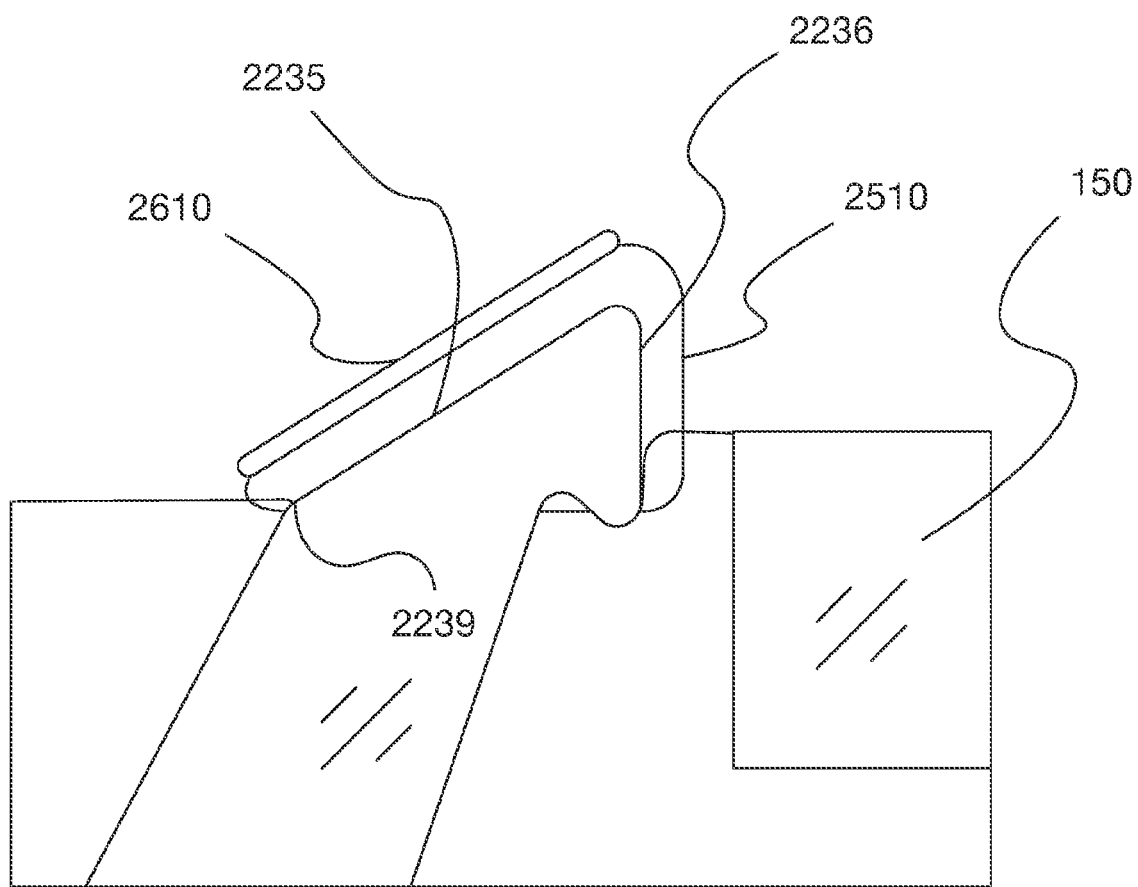
FIG. 26 shows an embodiment with a reflective light guide having a hard coating layer.

In FIG. 26, an embodiment similar to that shown in FIG. 25 is shown, wherein protective layer 2510 is further provided with hard layer 2610. Hard layer 2610 preferably covers surfaces most vulnerable to scratching, namely reflective surface 2235 and reflective surface edge 2239. Hard layer 2610 may comprise dielectric coatings, plastic hard coatings, chromium oxide, metal sheeting, etc. Hard layer 2610 advantageously physically protects coating layer 2510. This feature may be applied to any of the embodiments provided in the present description comprising a light guide with surfaces exposed to ambient light and/or environmental or user wear from contact with objects.

Figure 27:
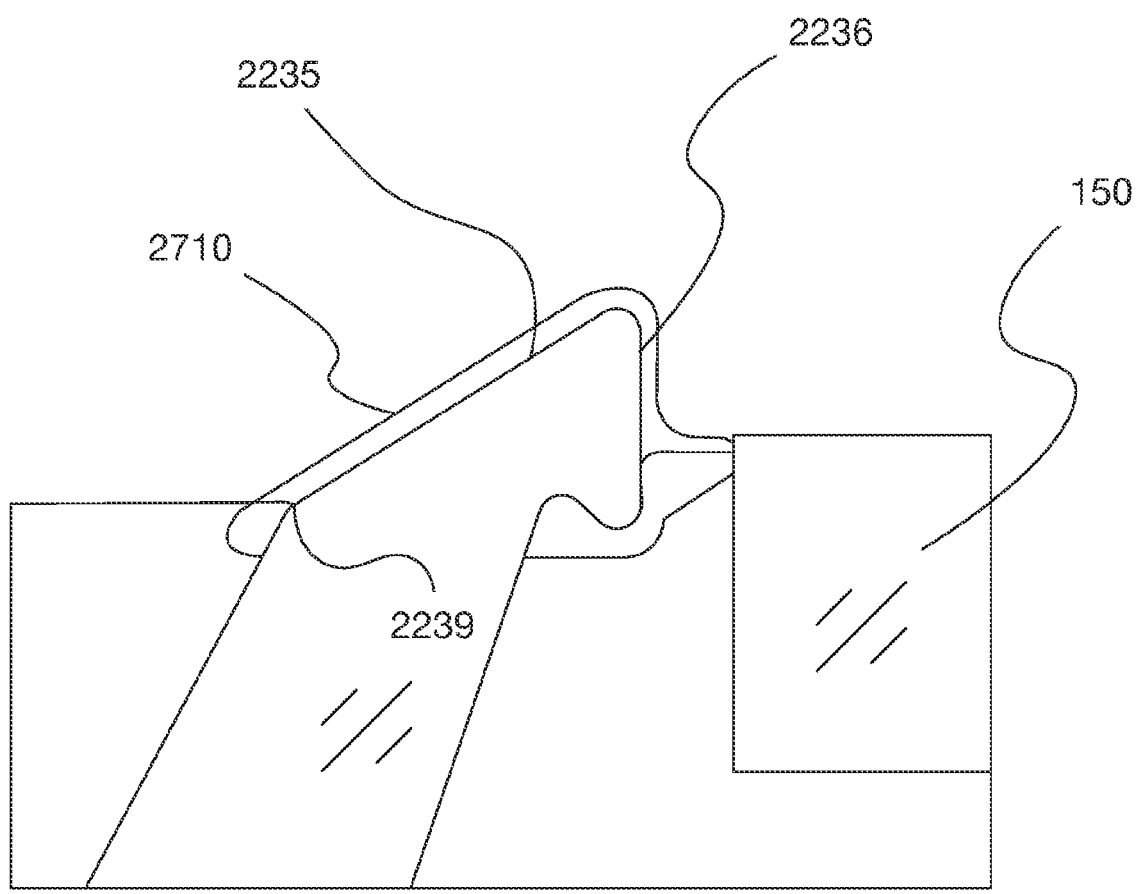
FIG. 27 shows another embodiment with a reflective light guide having a hard coating layer.

In FIG. 27, an embodiment similar to that shown in FIG. 25 is shown, wherein reflective surface 2235, reflective surface edge 2239, and/or top coupling surface 2236 are provided with hard layer 2710. Hard layer 2710 may comprise e.g. the hard coatings of the previous embodiment that are optically clear as well as standard spectacle lens coatings. Hard layer 2710 advantageously allows scratch protection of the exposed light guide surfaces. This feature may be applied to any of the embodiments provided in the present description comprising a light guide with surfaces exposed environmental or user wear from contact with objects.

Figure 28:
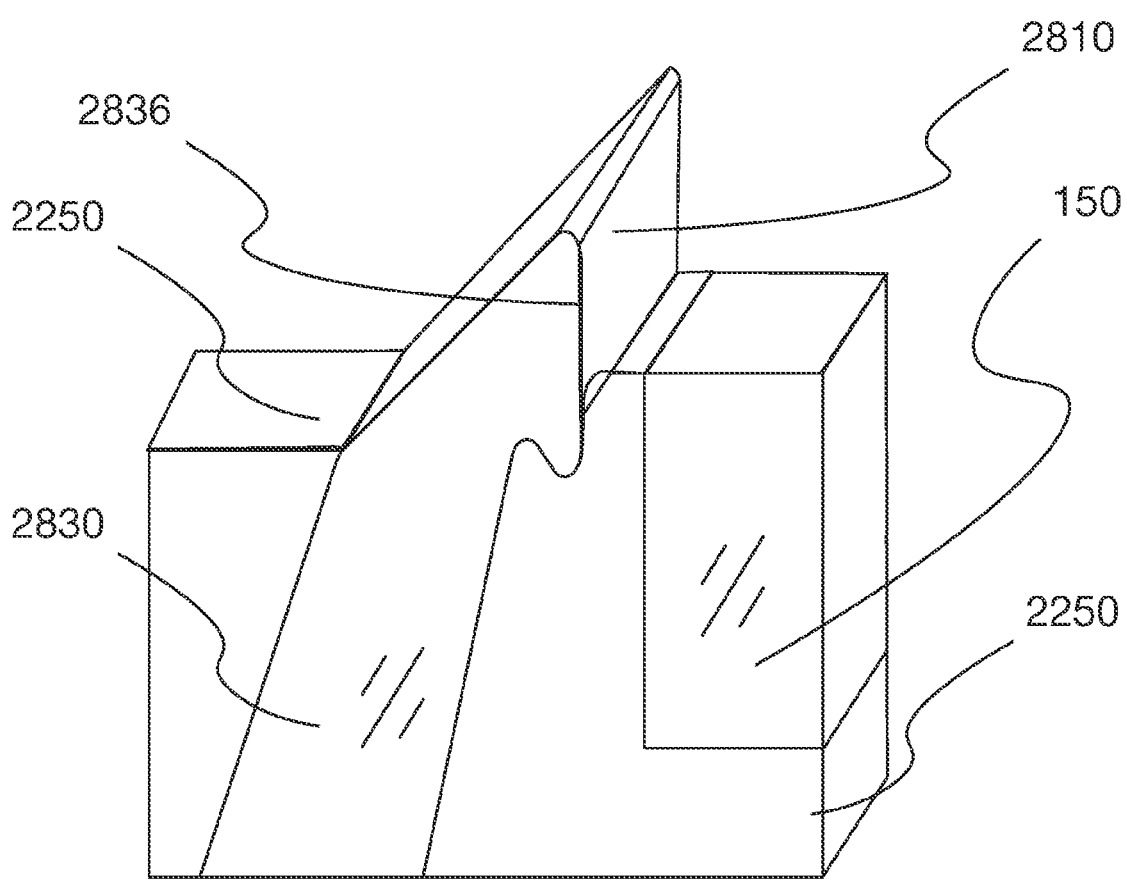
FIG. 28 shows an embodiment with a reflective light guide wherein the surface proximal the panel is vertically corrugated.

In FIG. 28, an isometric view of an embodiment similar to that shown in FIG. 15 is shown with a focus on top coupling surface 2836 and light guide 2830, and support components 2250. In this embodiment, top coupling surface 2836 comprises a vertical corrugation 2810. The corrugation may preferably be sinusoidal with a period length of between 0.1 mm-1 mm. This advantageously improves the spread of the light from emerging from surface 2836 in the plane of the touch surface, which allows more scanlines at high angles. This feature of the surface coupling light to or from the touch surface 140 having a vertical corrugation may be applied to any of the embodiments provided in the present description comprising a light guide.

The invention claimed is:

1. A touch sensing apparatus, comprising:
a light transmissive panel that defines a touch surface,
a plurality of light emitters and detectors arranged along a perimeter of the light transmissive panel, and
a plurality of optical components arranged along the perimeter of the light transmissive panel,
wherein the light emitters are arranged to emit a respective beam of emitted light and the optical components are configured to direct the emitted light to a path across the light transmissive panel,
the optical components comprise a reflector surface arranged above the touch surface to reflect light from the light emitters to the touch surface, wherein the reflector surface reflects light diffusively or partially diffusively, and
wherein the reflector surface comprises an anodized extruded component made from metal.

2. The touch sensing apparatus of claim 1, wherein the optical components comprise
a light guide arranged to receive light from the light emitters through a first surface and couple out light travelling in the light guide to the touch surface through a second surface.

3. The touch sensing apparatus of claim 2, wherein the second surface is diffusively transmissive.

4. The touch sensing apparatus of claim 1, wherein an angular filter is arranged between the optical components and touch surface and configured to only allow light travelling within 10 degrees of the plane of touch surface to pass between the touch surface and the optical components.

5. The touch sensing apparatus of claim 1, further comprising an elongate channel positioned between the light emitter and/or detector and the reflector surface, the elongate channel comprises channel walls, and wherein at least a portion of the channel walls are configured to absorb light.

6. The touch sensing apparatus of claim 5, wherein the elongate channel is an airgap.

7. The touch sensing apparatus of claim 6, wherein the airgap extends between the light emitter and/or detector and the reflector surface.

8. The touch sensing apparatus of claim 5, wherein the elongate channel is not straight and wherein the channel walls comprise internally reflective surfaces.

9. The touch sensing apparatus of claim 5, wherein the elongate channel comprises a light transmissive medium with a low refractive index.

10. The touch sensing apparatus of claim 5, wherein the elongate channel comprises a light guide.

11. A touch sensing apparatus, comprising:
a light transmissive panel that defines a touch surface,
a plurality of light emitters and detectors arranged along a perimeter of the light transmissive panel, and
a plurality of optical components arranged along the perimeter of the light transmissive panel,
wherein the light emitters are arranged to emit a respective beam of emitted light and the optical components are configured to direct the emitted light to a path across the light transmissive panel,
the optical components comprise a reflector surface arranged above the touch surface to reflect light from the light emitters to the touch surface, wherein the reflector surface reflects light diffusively or partially diffusively, wherein the reflector surface comprises an anodized extruded component made from metal,
an elongate channel positioned between the light emitter and/or detector and the reflector surface, and
wherein the elongate channel is an airgap and comprises channel walls, and wherein at least a portion of the channel walls are configured to absorb light.

12. The touch sensing apparatus of claim 11, wherein the channel has a channel axis and the channel walls comprise one or more light absorbent walls configured to absorb light travelling at an angle deviant from the angle of the channel axis.

13. The touch sensing apparatus of claim 11, wherein the airgap extends between the light emitter and/or detector and the reflector surface.

14. A touch sensing apparatus, comprising:
a light transmissive panel that defines a touch surface,
a plurality of light emitters and detectors arranged along a perimeter of the light transmissive panel, and
a plurality of optical components arranged along the perimeter of the light transmissive panel,
wherein the light emitters are arranged to emit a respective beam of emitted light and the optical components are configured to direct the emitted light to a path across the light transmissive panel, the optical components comprise a reflector surface arranged above the touch surface to reflect light from the light emitters to the touch surface, wherein the reflector surface comprises an anodized extruded component made from metal.

15. The touch sensing apparatus of claim 14, wherein the reflector surface reflects light diffusively or partially diffusively.

16. The touch sensing apparatus of claim 14, wherein the reflector surface reflects light specularly or partially specularly.

17. The touch sensing apparatus of claim 16, wherein the reflector surface comprises a mirror coating.

18. The touch sensing apparatus of claim 14, wherein the metal is aluminum.

* * * * *